United States Patent
Horstein

[11] Patent Number: 6,073,011
[45] Date of Patent: Jun. 6, 2000

[54] COMMUNICATION SATELLITE LOAD BALANCING SYSTEM AND METHOD

[75] Inventor: Michael Horstein, Los Angeles, Calif.

[73] Assignee: TRW Inc., Redondo Beach, Calif.

[21] Appl. No.: 08/575,741

[22] Filed: Dec. 19, 1995

[51] Int. Cl.⁷ ................................................. H04Q 7/20
[52] U.S. Cl. .................... 455/427; 455/453; 455/13.1; 455/13.4
[58] Field of Search .................. 455/12.1, 13.1, 455/13.4, 33.1, 33.2, 33.4, 34.1–34.2, 54.1, 56.1, 58.1, 62, 427, 430, 450–453, 429; 342/352; 379/59–60, 63

[56] References Cited

U.S. PATENT DOCUMENTS

| | | |
|---|---|---|
| 4,315,262 | 2/1982 | Acampora et al. . |
| 4,823,341 | 4/1989 | Rosen . |
| 5,067,147 | 11/1991 | Lee . |
| 5,073,900 | 12/1991 | Mallinckrodt . |
| 5,212,806 | 5/1993 | Natarajan ................................. 455/56.1 |
| 5,227,802 | 7/1993 | Pullman et al. . |
| 5,241,685 | 8/1993 | Bodin et al. . |
| 5,367,304 | 11/1994 | Jan et al. . |
| 5,379,448 | 1/1995 | Ames et al. . |
| 5,396,643 | 3/1995 | Frenzer et al. . |
| 5,408,237 | 4/1995 | Patterson et al. . |
| 5,422,647 | 6/1995 | Hirshfield et al. . |
| 5,430,729 | 7/1995 | Rahnema . |
| 5,448,621 | 9/1995 | Knudsen ................................. 455/33.2 |
| 5,625,868 | 4/1997 | Jan et al. ................................. 455/13.4 |

Primary Examiner—Nguyen Vo
Attorney, Agent, or Firm—Michael S. Yatsko

[57] ABSTRACT

A method of controlling communication satellite system capacity in a satellite-based cellular telecommunication system where two or more communication satellites provide coverage of a service region. Communication satellites are assigned to mobile cellular stations in a manner designed to minimize the maximum single-satellite power that is required for the communication satellites collectively to supply a specified number of transmissions to the service region. The service region may be divided into grids, where each grid is characterized by a number which is proportional to the average number of active mobile cellular stations. This information, in conjunction with a power utilization factor associated with each satellite/grid pair, is used to determine the assignments of the communication satellites to the mobile cellular stations.

11 Claims, 33 Drawing Sheets

FIG. 1
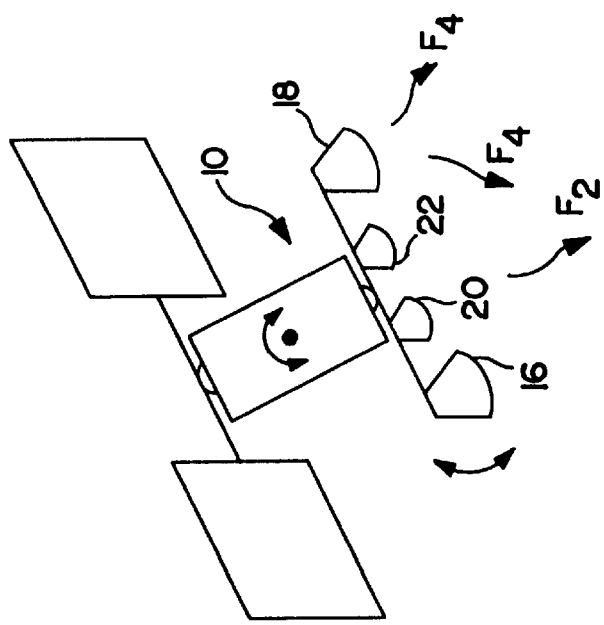
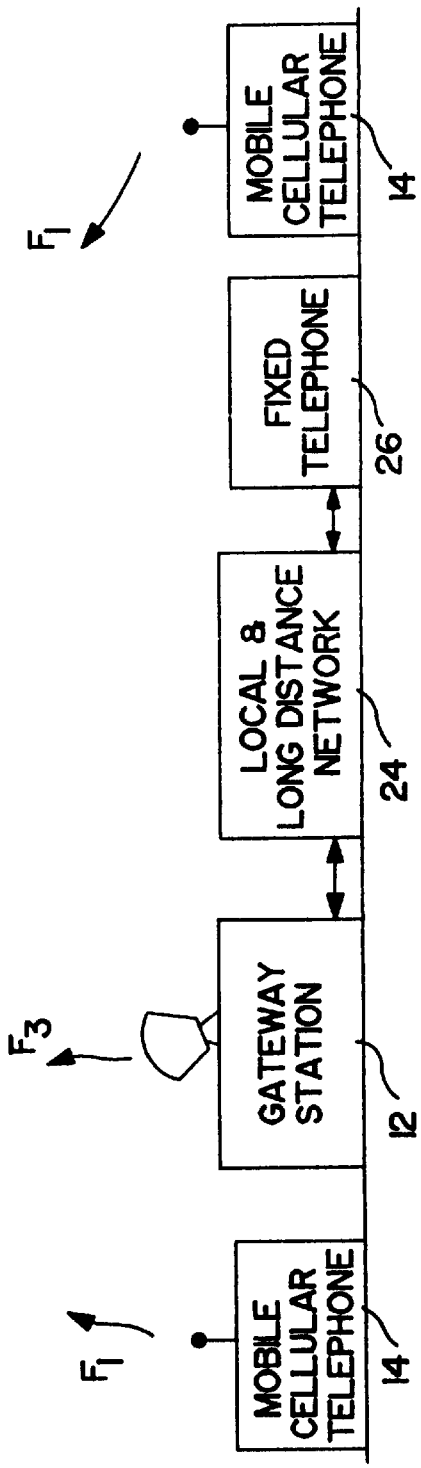

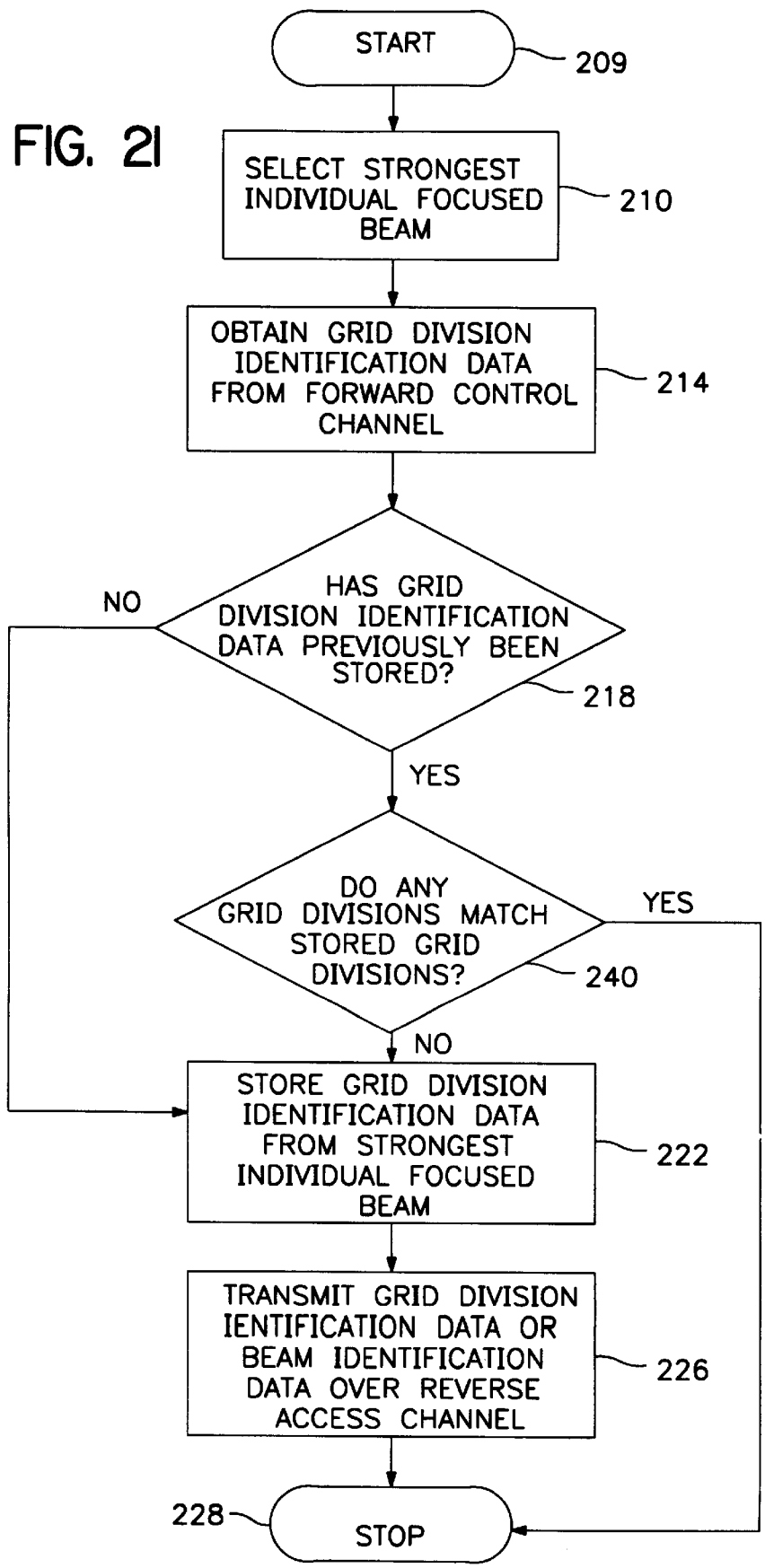

COMMUNICATION SATELLITE LOAD BALANCING SYSTEM AND METHOD

BACKGROUND OF THE INVENTION

1. Field of the Invention

The present invention relates generally to communication satellites. More particularly, the present invention relates to a satellite load balancing system and method which maximize the regional system capacity for a multiplicity of satellites and users.

2. Description of the Prior Art

In the past, telecommunication satellites have generally been positioned in a particular geostationary orbit to serve a fixed geographic area. More recently, medium-earth-orbit communication satellite systems and low-earth-orbit communication satellite systems have been proposed for global telecommunication. Such lower altitude satellite configurations permit the communication satellites to service different geographical regions over time since the satellites would not be essentially fixed over a geographical point of the earth. The geographical regions to which communication satellite systems provide communication transmissions are designated as service regions.

Moreover, a lower altitude communication satellite configuration may be capable of two or more of its communication satellites supporting the same service region. The degree of communication satellite depends on its current position relative to the service region. The overall lower altitude communication satellite regional system capacity varies with time because of the satellite motion, and also with the geographic subscriber distribution.

Consequently, the lower altitude communication satellite configuration is not adequately described with the traditional communication satellite capacity definition. More particularly, the traditional communication satellite capacity definition does not focus on the level of service that an entire system of satellites can provide to a given service region.

Therefore, it is an objective of the present invention to determine a set of communication satellite assignments relative to different portions of the service region that achieves an optimum communication satellite system capacity for that region.

SUMMARY OF THE INVENTION

A method of controlling system capacity in a satellite-based cellular telecommunication system involves a plurality of communication satellites orbiting above a commonly-covered region of the earth and a plurality of mobile cellular stations which are capable of communicating with at least a plurality of said orbiting communication satellites during at least some interval of time. The method includes the step of determining, for each of the communication satellites at periodic intervals, a power utilization factor which is selectively employed to avoid a communication saturation condition for any of the communication satellites. The method also includes the step of assigning a communication channel between the mobile cellular station and one of the orbiting satellites on the basis of a criterion that includes the power utilization factor.

According to one feature of the invention, a mobile cellular station is enabled to override the assignment in response to environmental conditions, such that a different communication channel between the mobile cellular station and one of said orbiting satellites will be determined by the mobile cellular station.

According to another feature the assignment is uploaded from an earth-based station to the communication satellites.

In yet another feature of the invention, the uploaded assignment is broadcast from each of the communication satellites to the commonly-covered region.

In another feature of the invention, the power utilization factor is employed when the communication channel load on one of the communication satellites exceeds a predetermined amount.

Another feature of the invention includes the power utilization factor minimizing the maximum single-satellite power required for said communication satellites to supply a predetermined number of communication channels in accordance with the geographic distribution of demand.

Another feature of the invention includes the power utilization factor leveling the communication channel load between communication satellites.

The present invention can be applied to a system of lower-altitude communication satellites for mobile cellular communications. In such a system of lower-altitude communication satellites, a mobile cellular station can communicate to a control station and to its ultimate destination through one of the communication satellites that has been assigned to the mobile cellular station by the control station.

BRIEF DESCRIPTION OF THE DRAWINGS

The various advantages of the present invention will become apparent to those skilled in the art after studying the following specification and by reference to the drawings in which:

FIG. 1 is a schematic illustration of a satellite based cellular telecommunications system which may be utilized in accordance with the present invention;

FIG. 21 is a flowchart of a registration operation performed by the mobile handset tracking and paging system;

DETAILED DESCRIPTION OF THE PREFERRED EMBODIMENT

Figure 2:
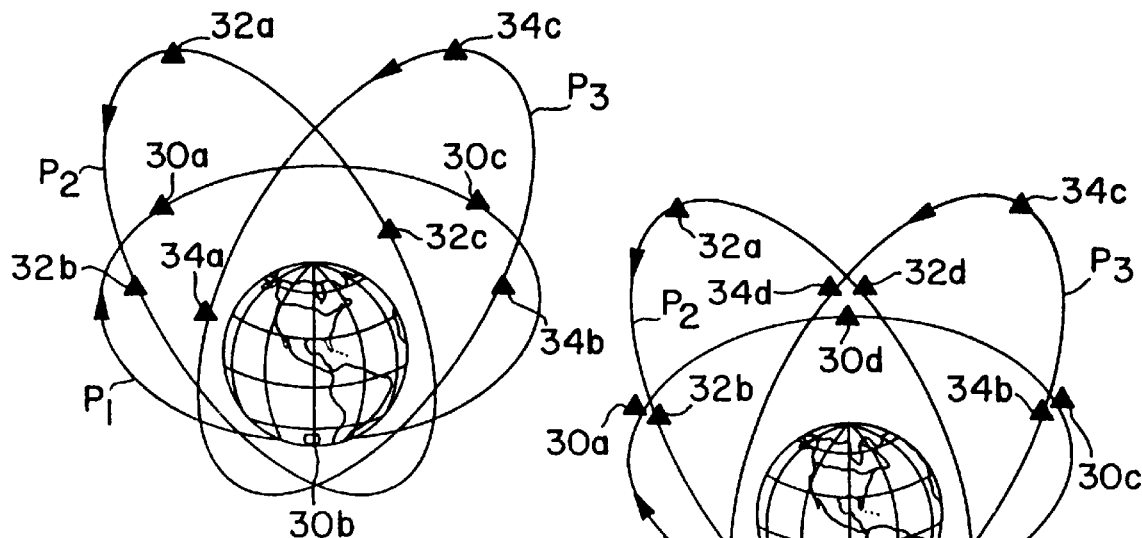
FIG. 2 is a schematic illustration of a constellation of telecommunication satellites providing single global land mass coverage of the earth.
Figure 3:
FIG. 3 is a schematic illustration of a constellation of telecommunication satellites providing double global land mass coverage of the earth.
Figure 4:
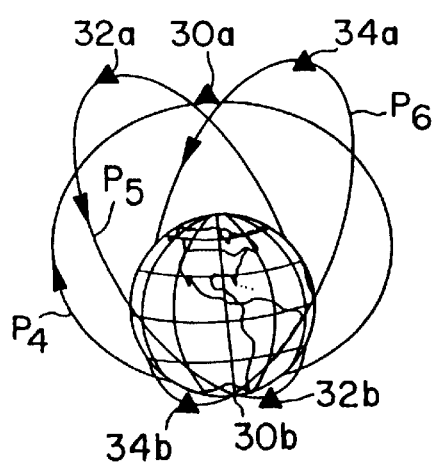
FIG. 4 is a schematic illustration of a constellation of telecommunication satellites providing single hemispheric coverage of the earth.
Figure 5:
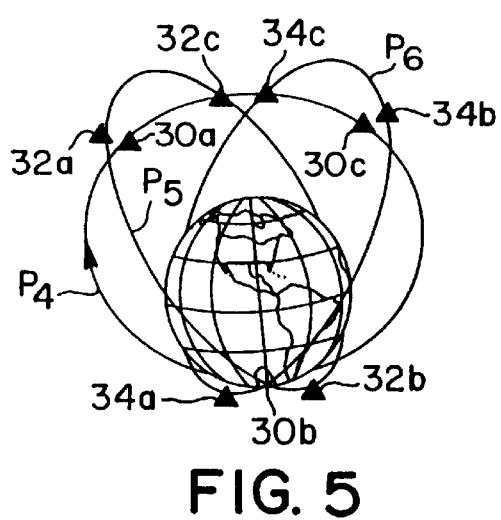
FIG. 5 is a schematic illustration of a constellation of telecommunication satellites providing double hemispheric coverage of the earth.
Figure 6:
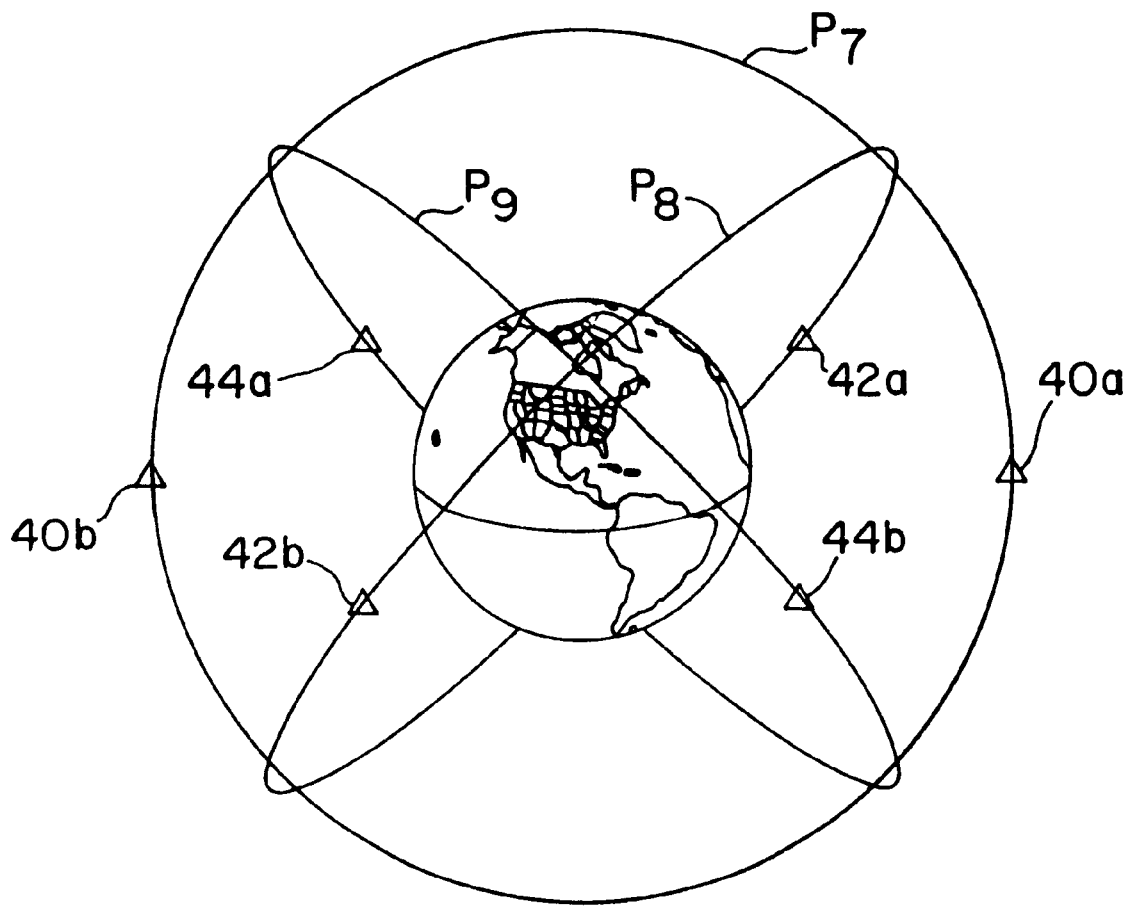
FIG. 6 is a schematic illustration of a original constellation of telecommunication satellites which provides partial coverage of the earth.
Figure 7:
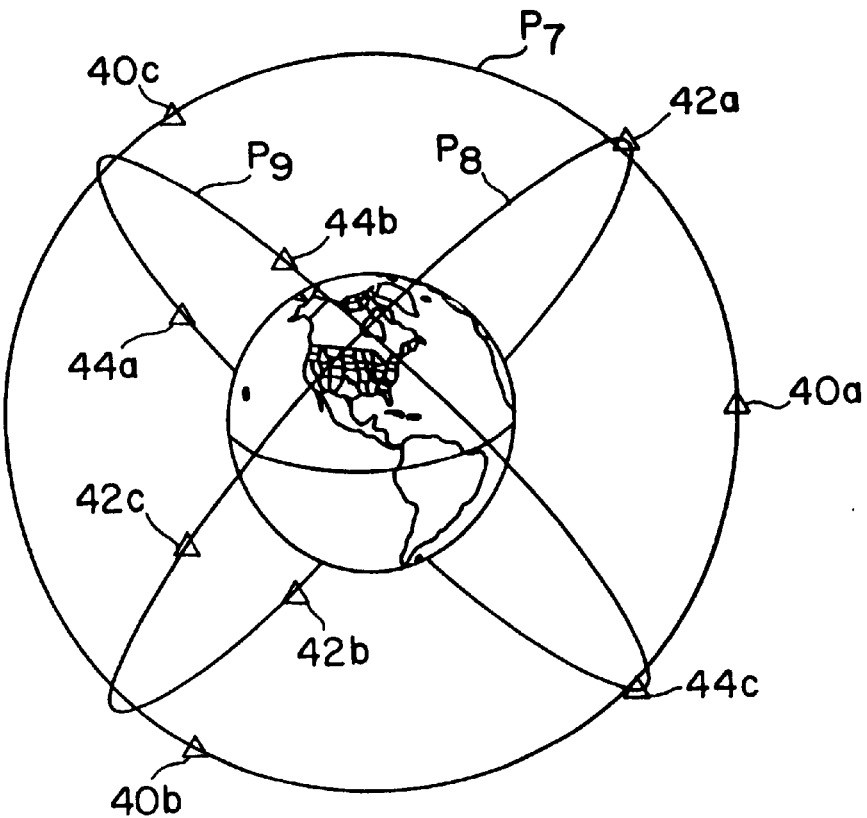
FIG. 7 is a schematic illustration can follow-on constellation of telecommunication satellites which provides further coverage of the earth.
Figure 8:
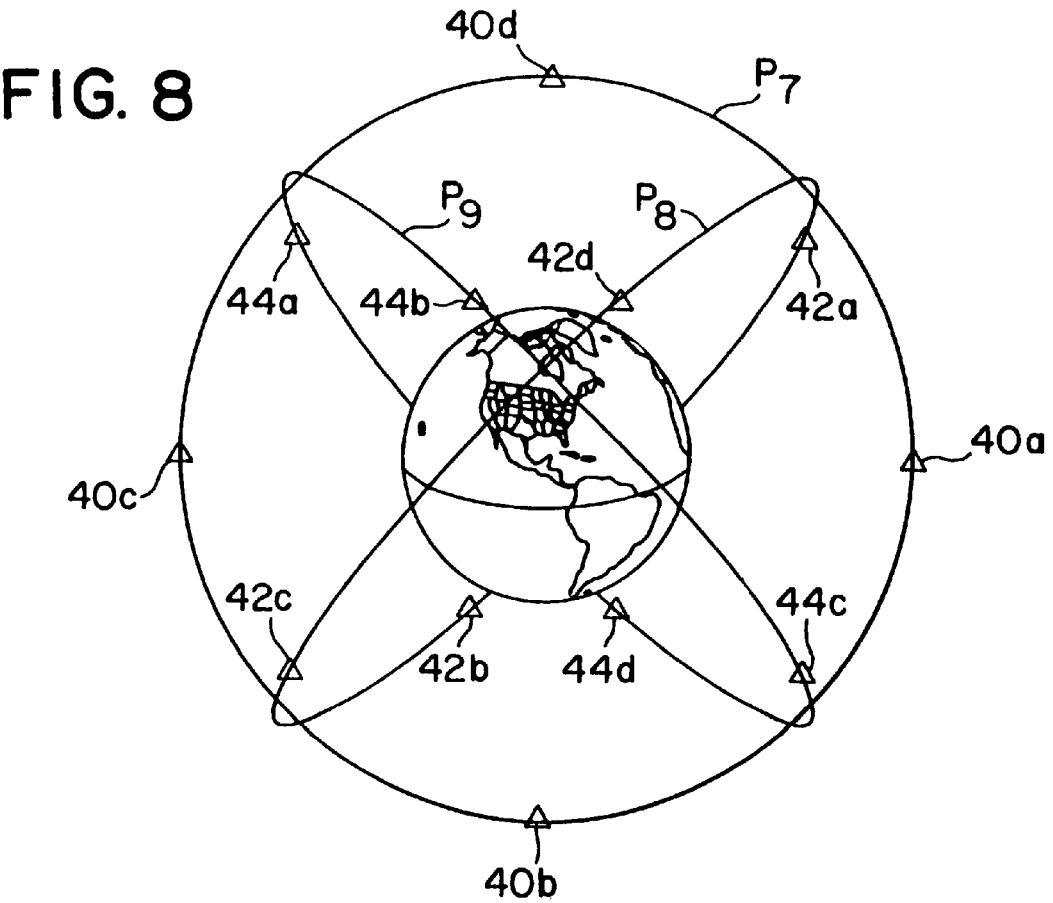
FIG. 8 is a schematic illustration of a full baseline constellation of telecommunication satellites which provides complete land mass coverage of the earth.
Figure 9:
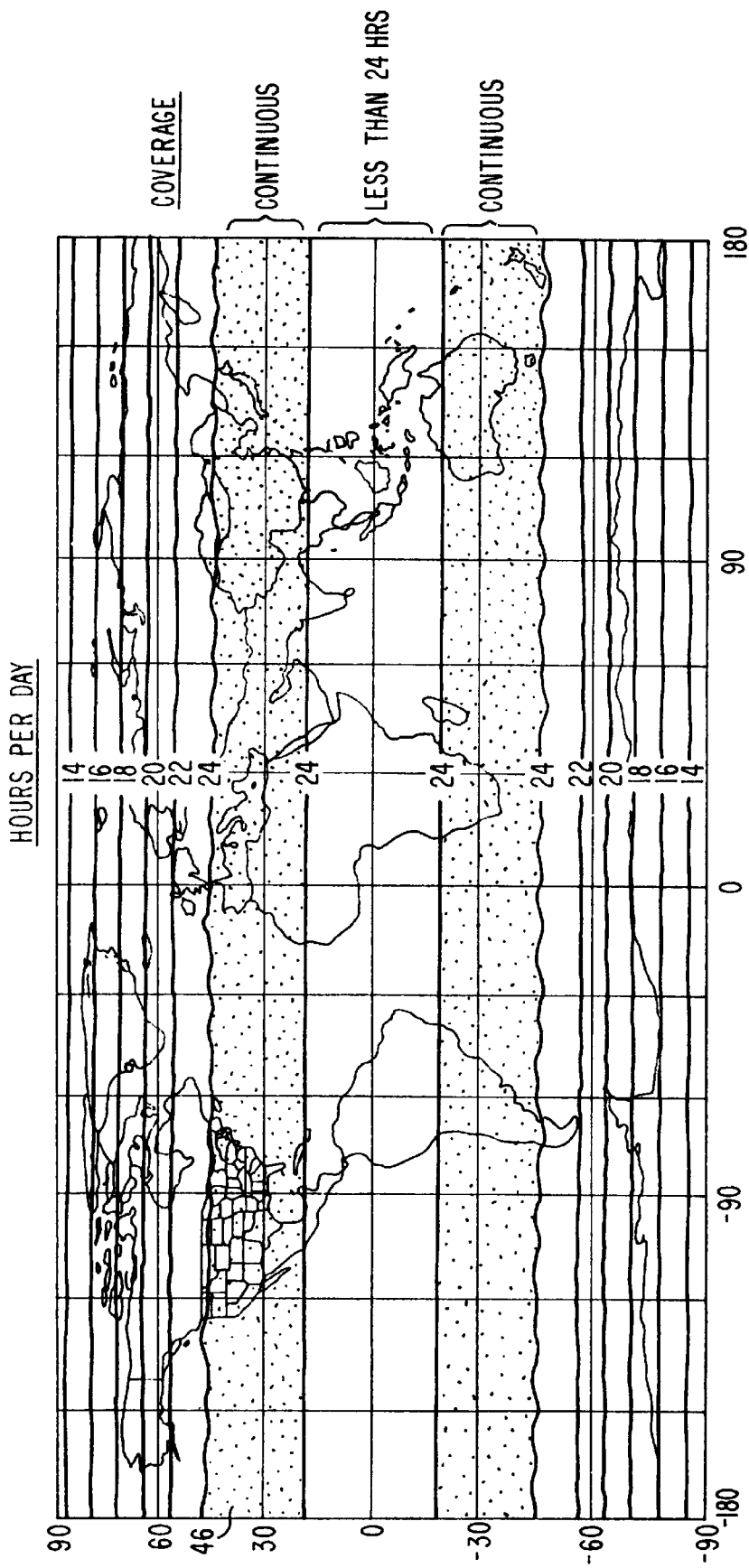
FIG. 9 is a cartographic illustration of satellite visibility using the original constellation of FIG. 6.
Figure 10:
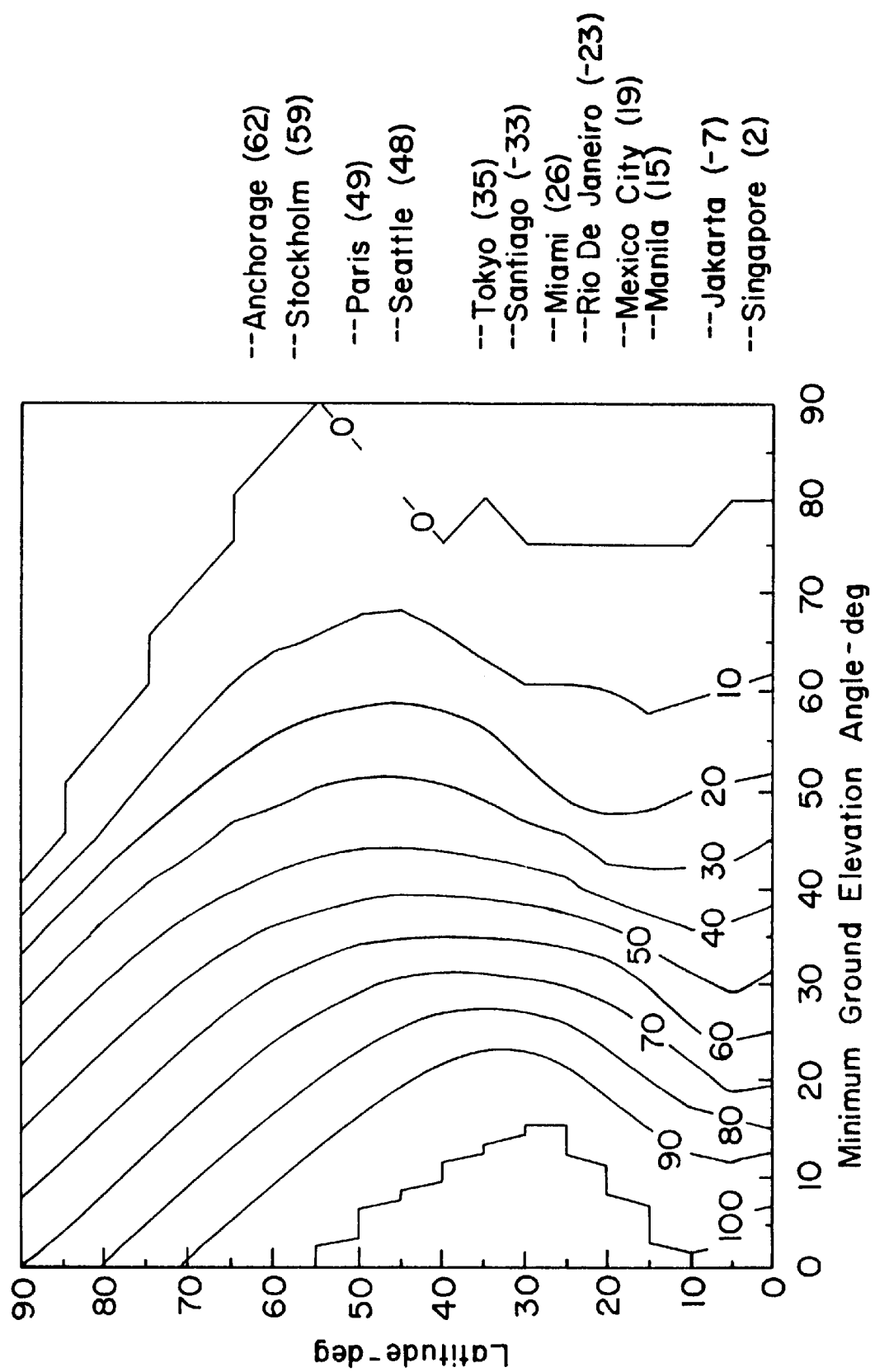
FIG. 10 is a graphical illustration of satellite coverage using the original constellation of FIG. 6.
Figure 11:
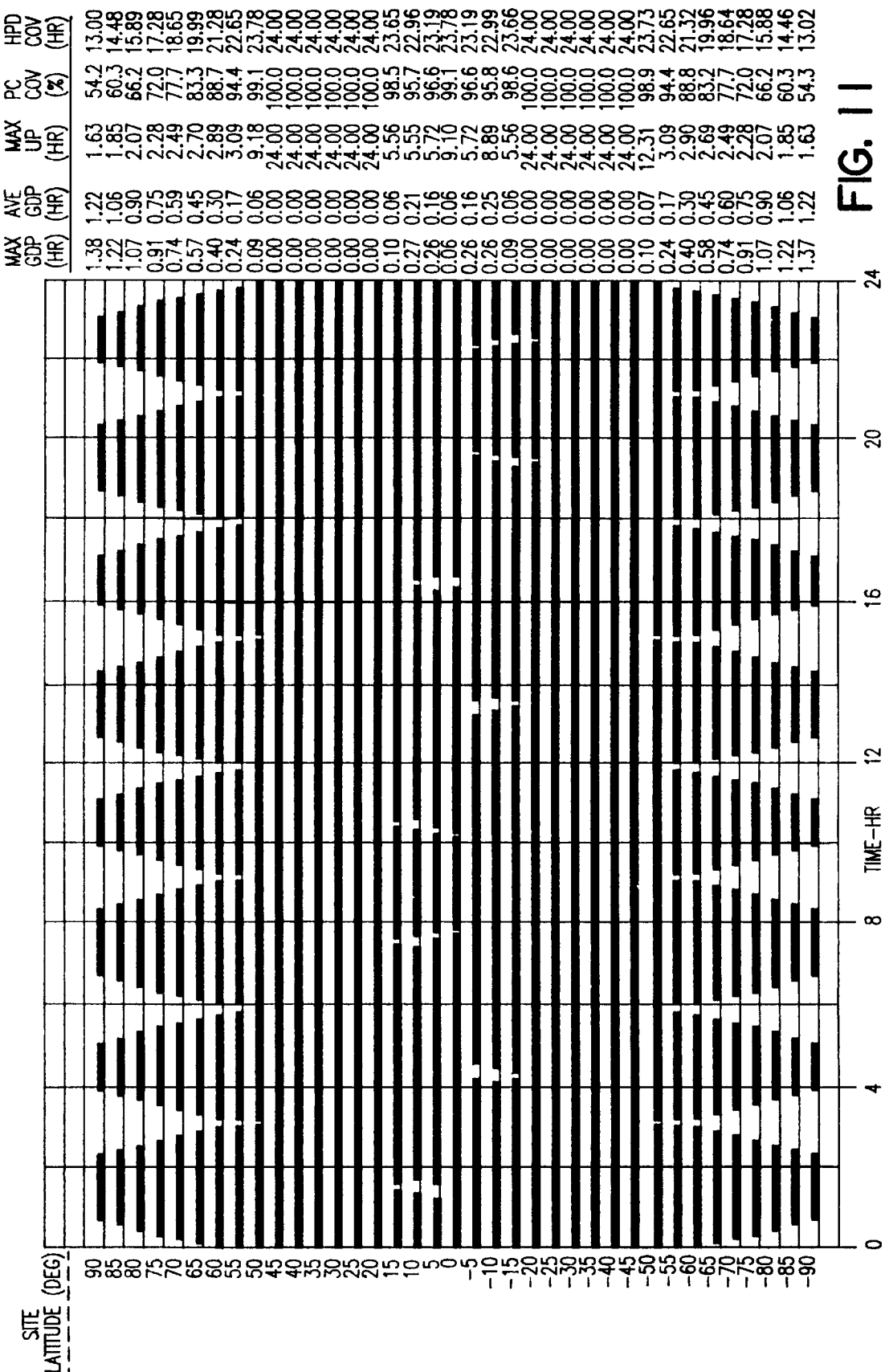
FIG. 11 is another graphical illustration of satellite coverage using the original constellation of FIG. 6.
Figure 12A:
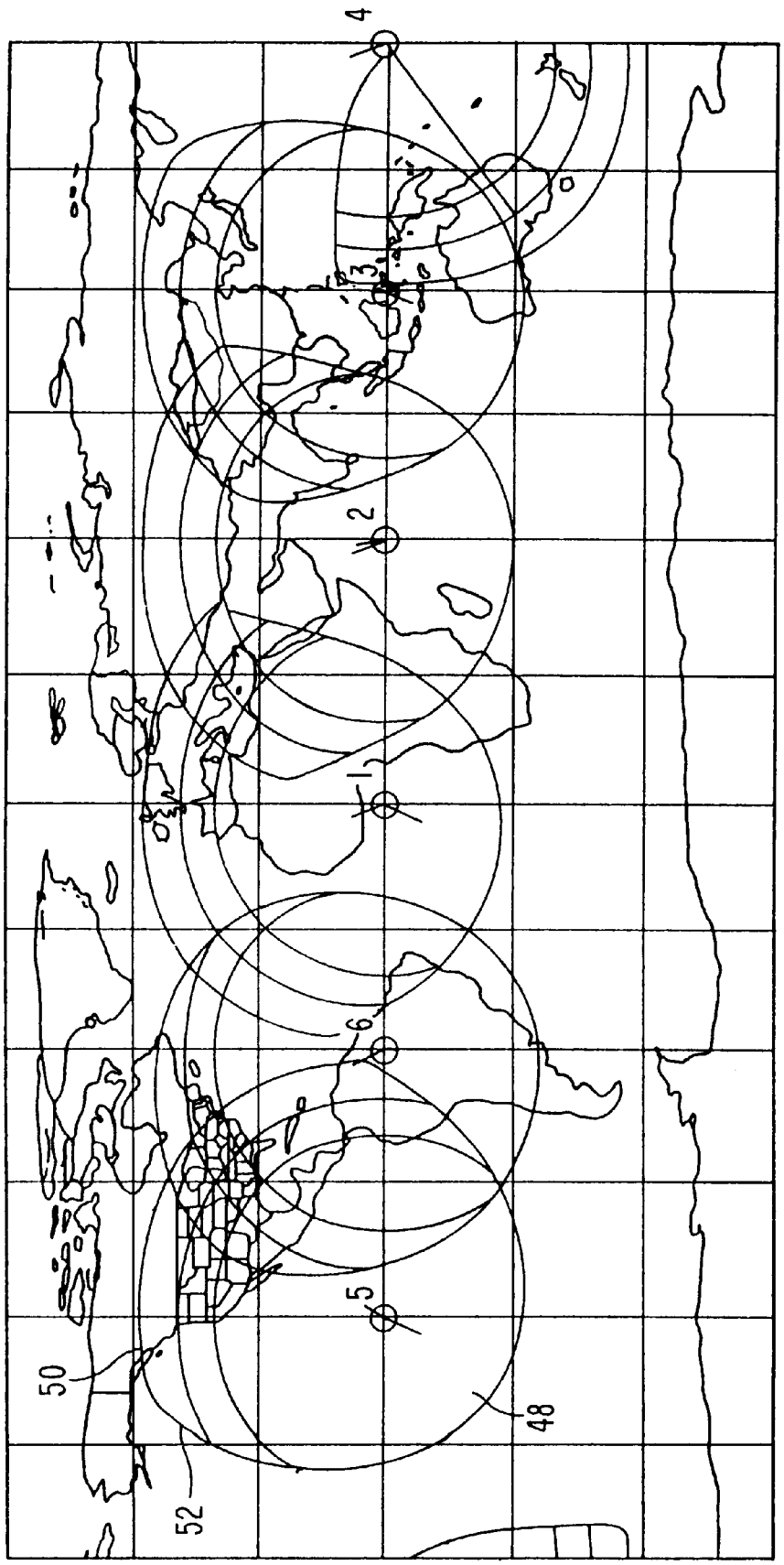
FIGS. 12A–12E provide a cartographic illustration of satellite coverage using the original constellation of FIG. 6.
Figure 12B:
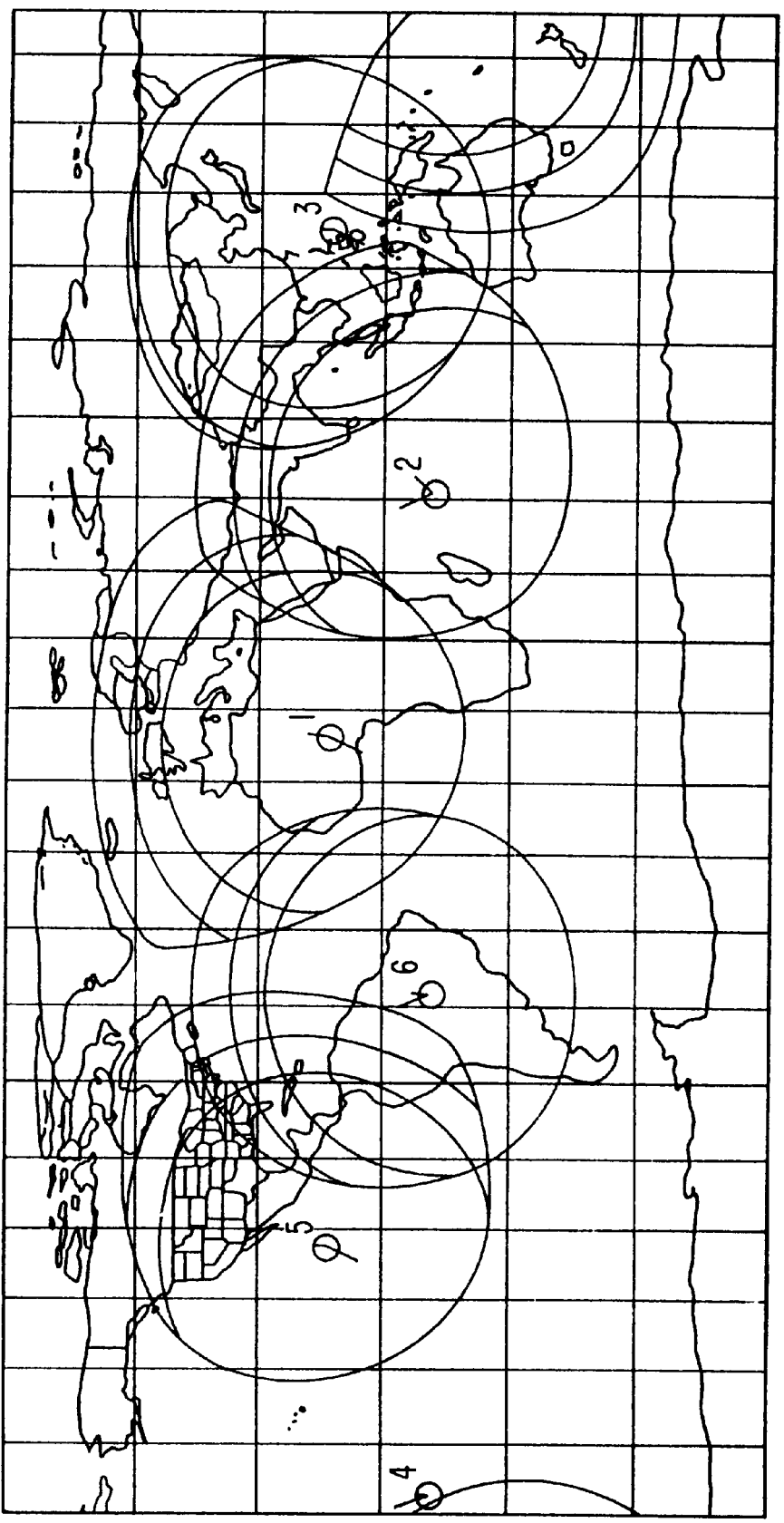
Figure 12C:
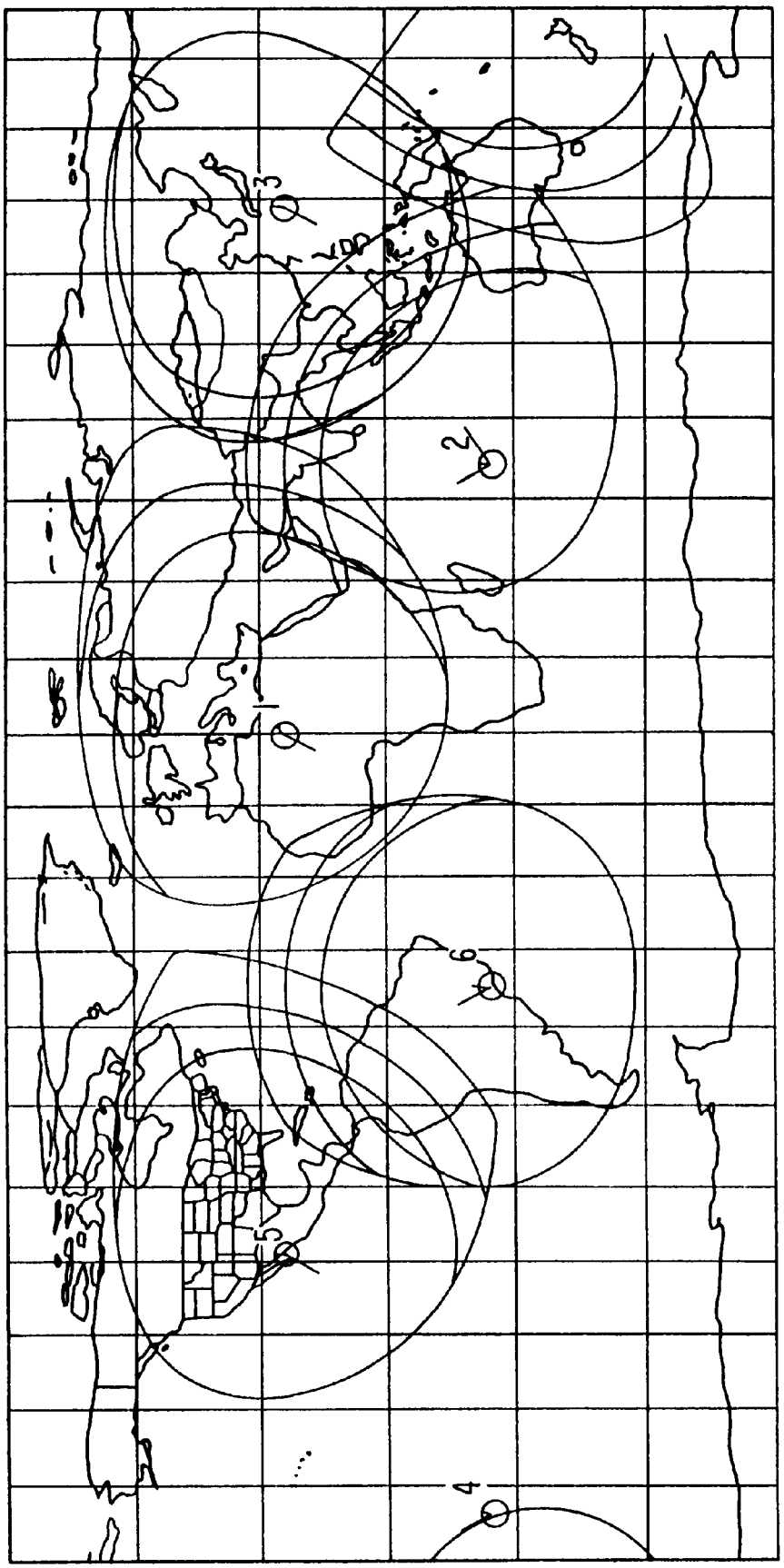
Figure 12D:
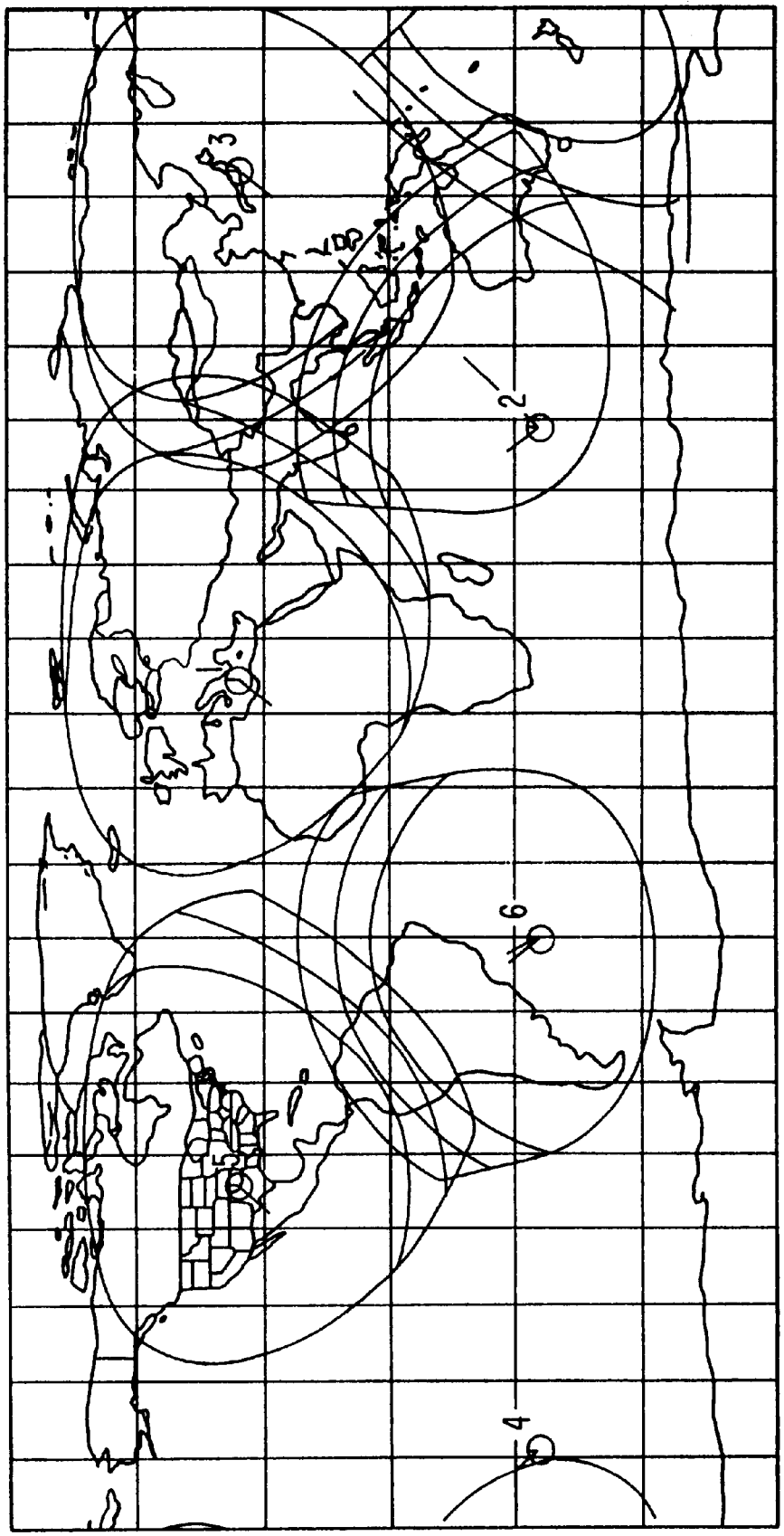
Figure 12E:
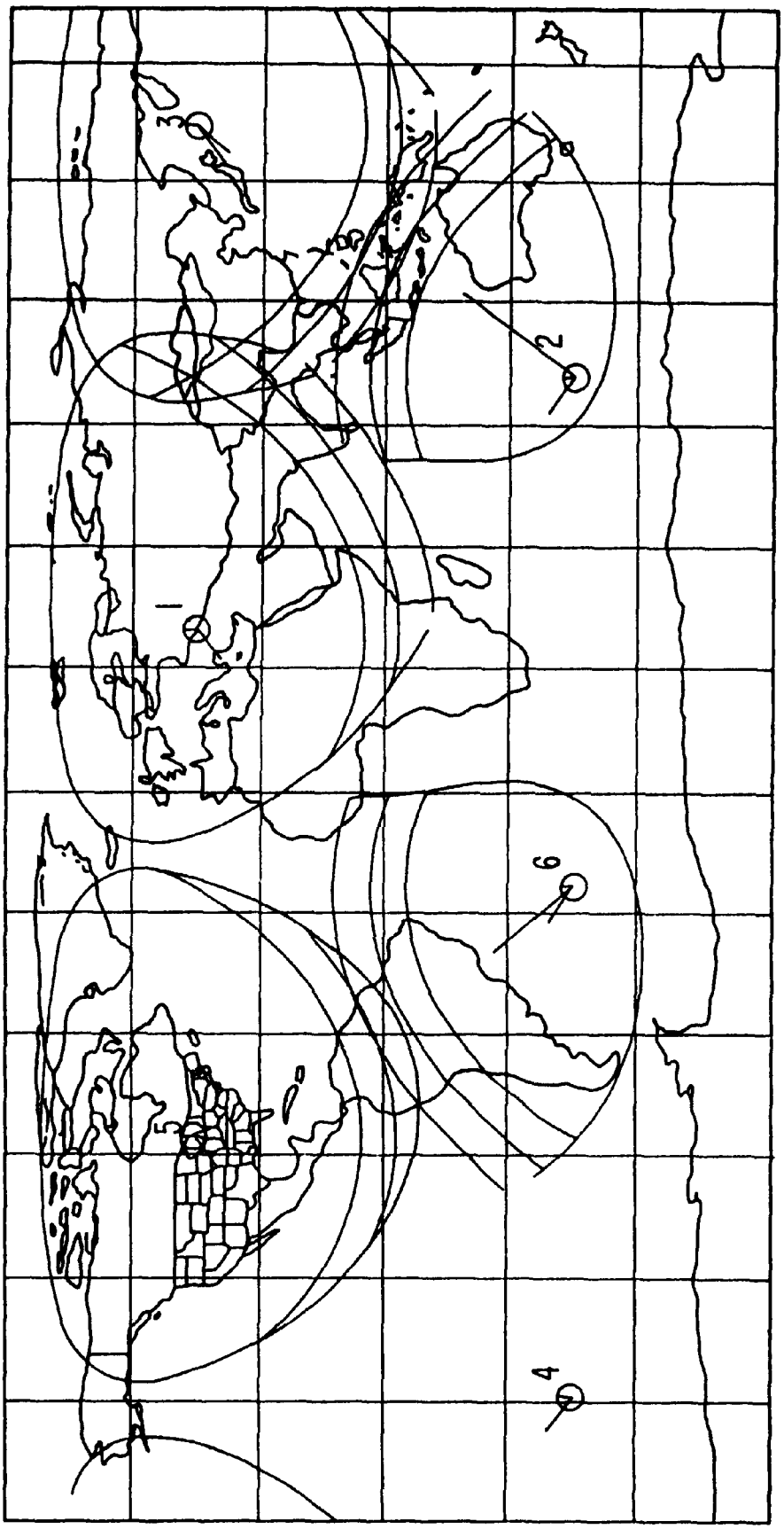
Figure 13A:
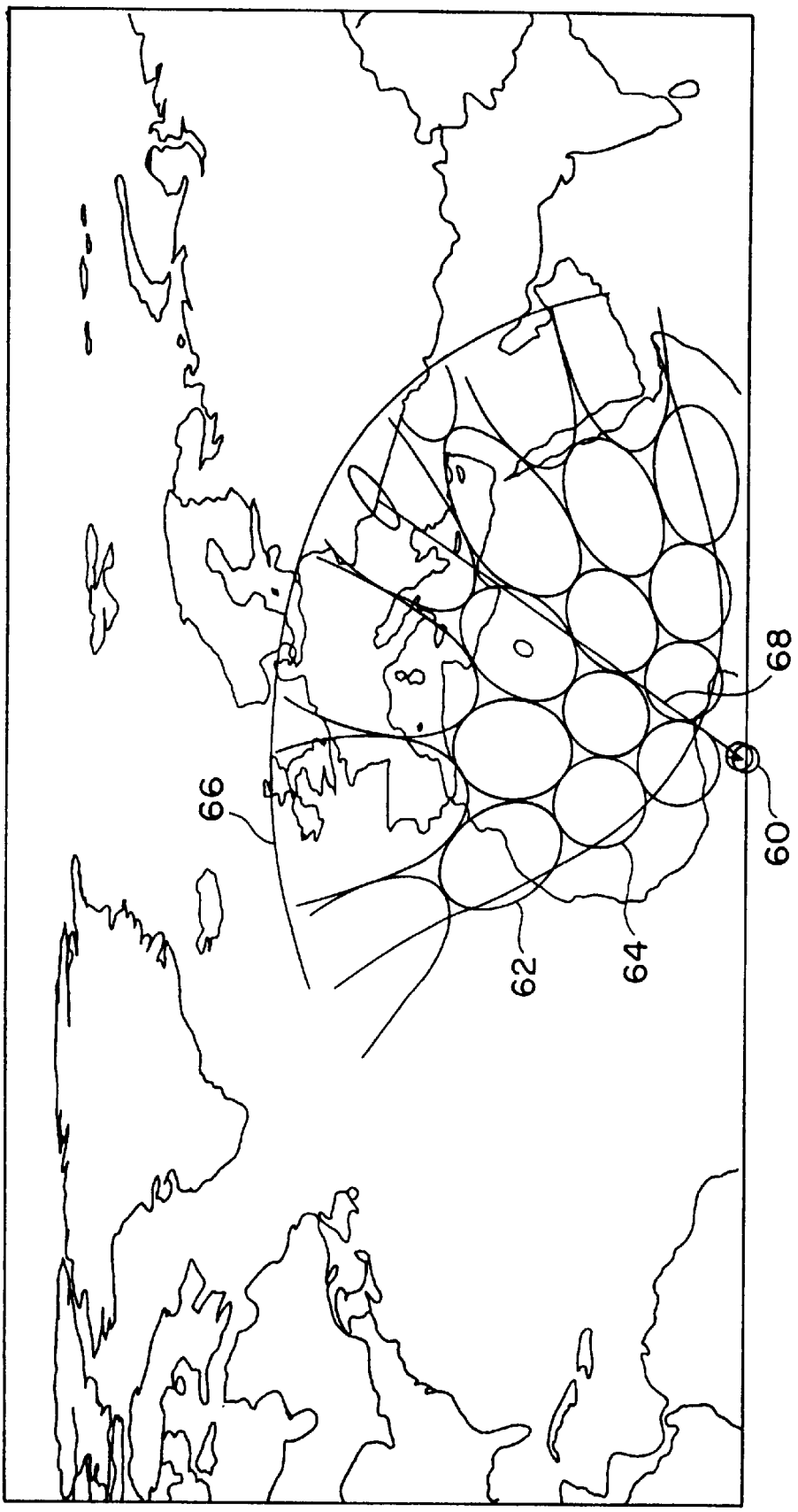
FIGS. 13A–13G provide a cartographic illustration of the variable antenna pattern using a beam-steering method.
Figure 13B:
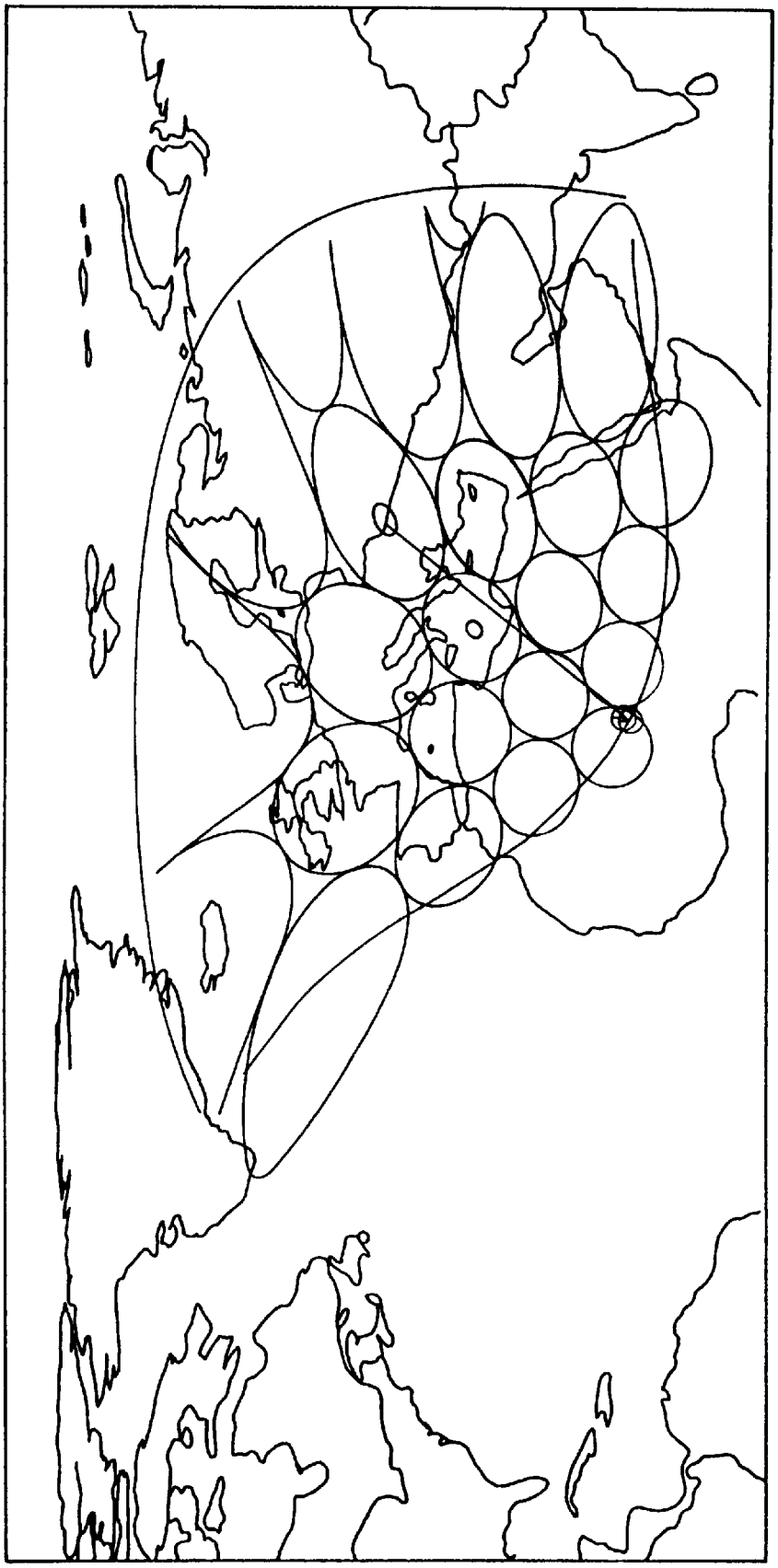
Figure 13C:
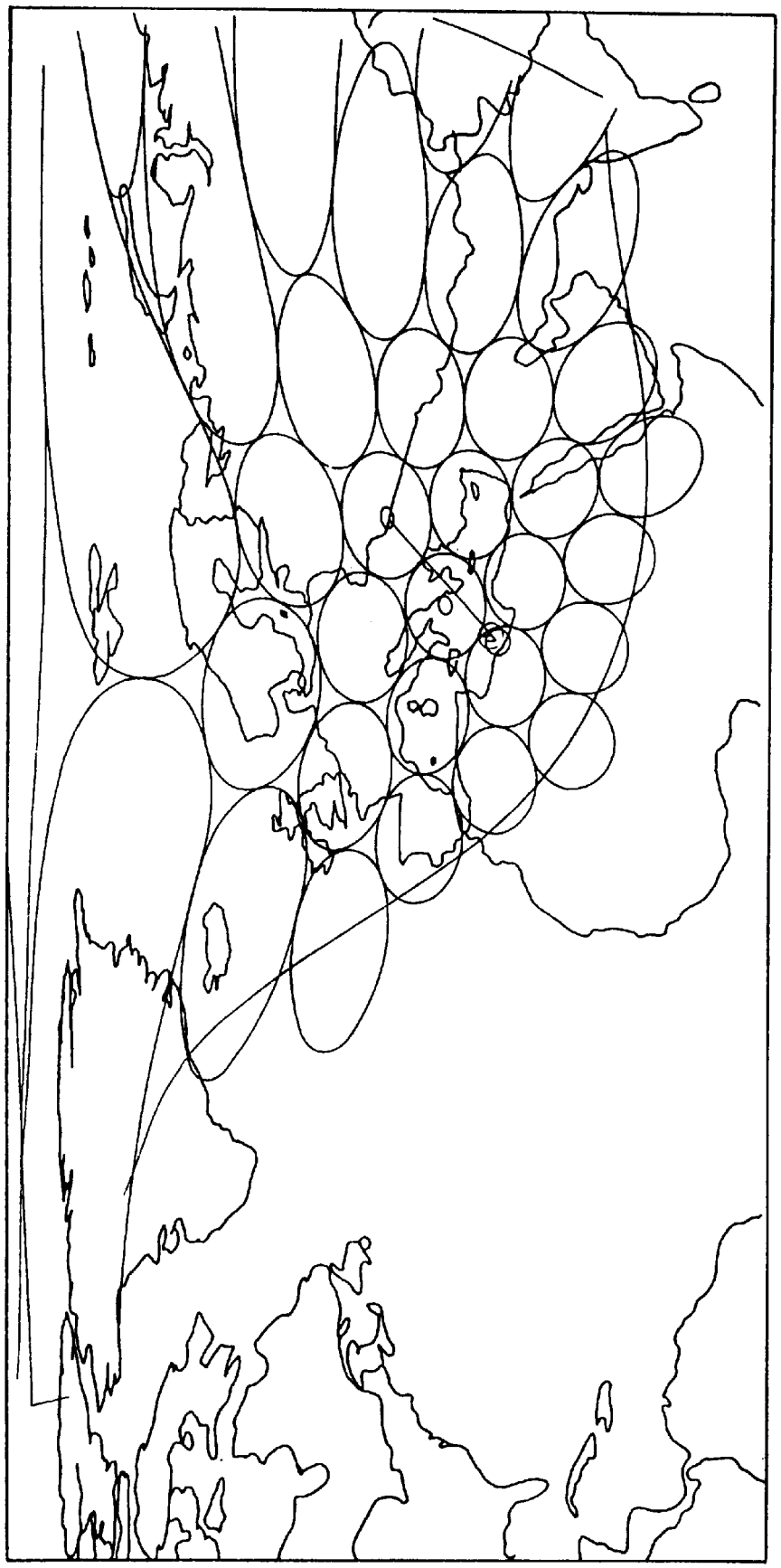
Figure 13D:
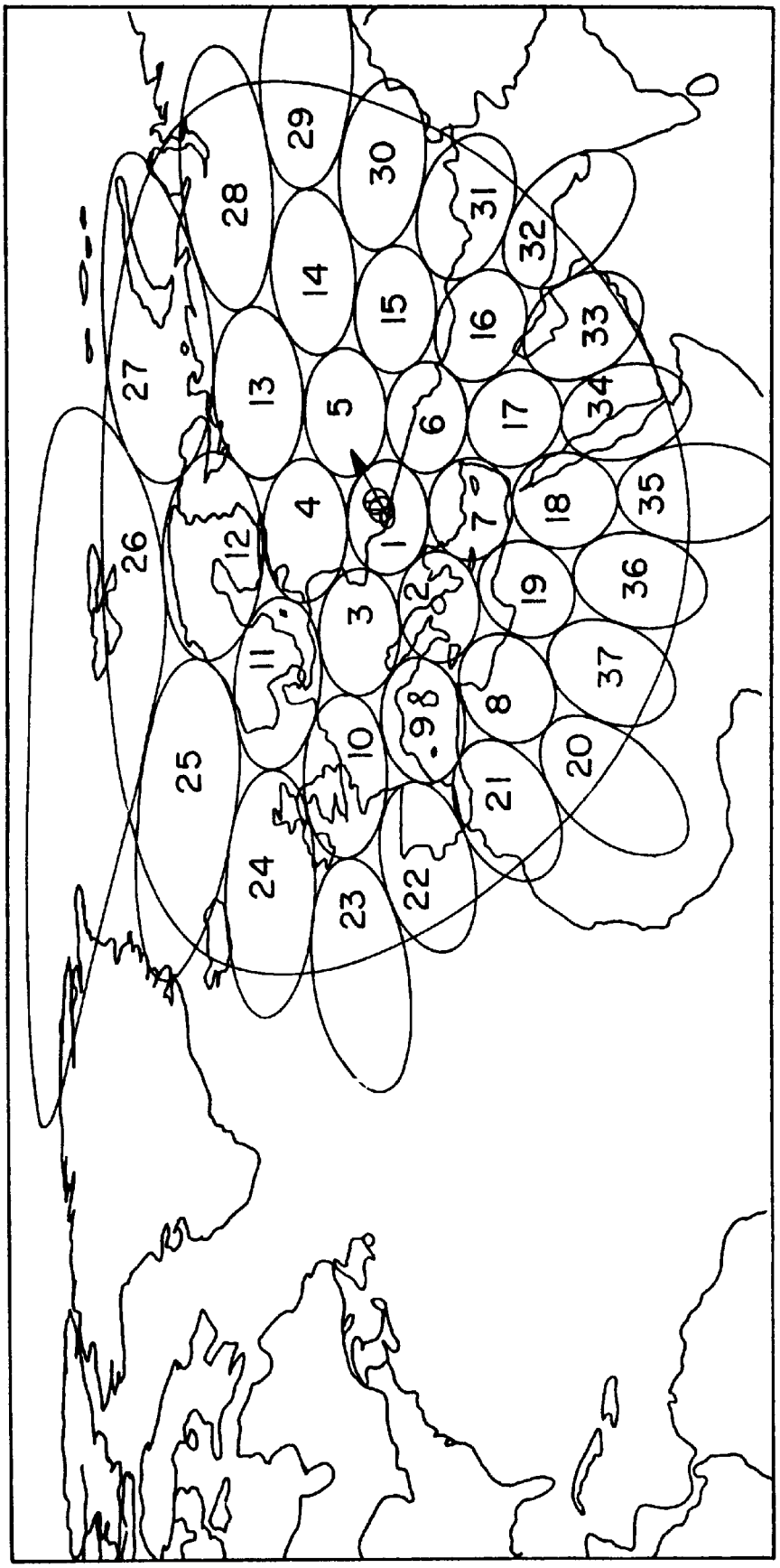
Figure 13E:
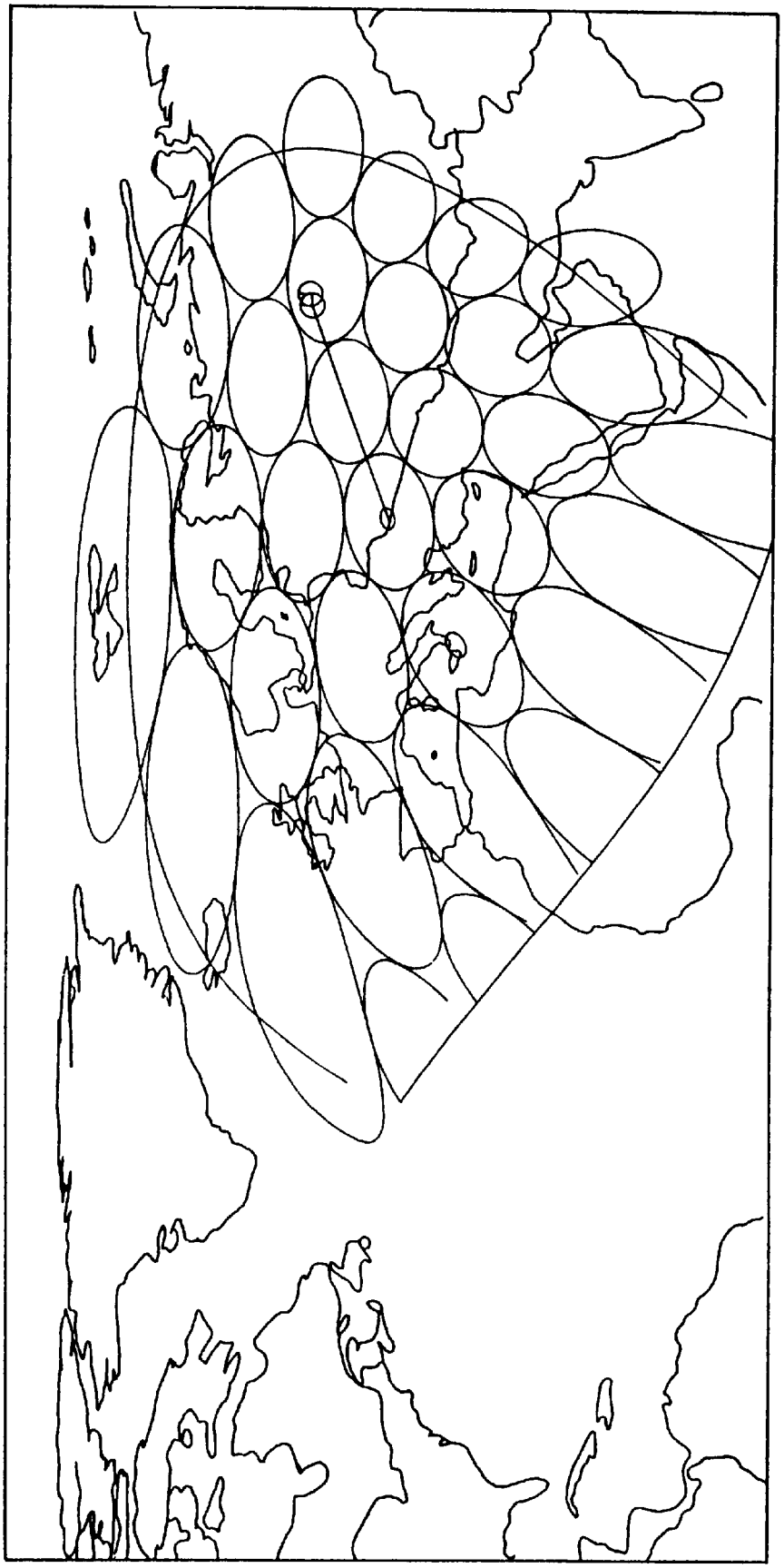
Figure 13F:
Figure 13G:
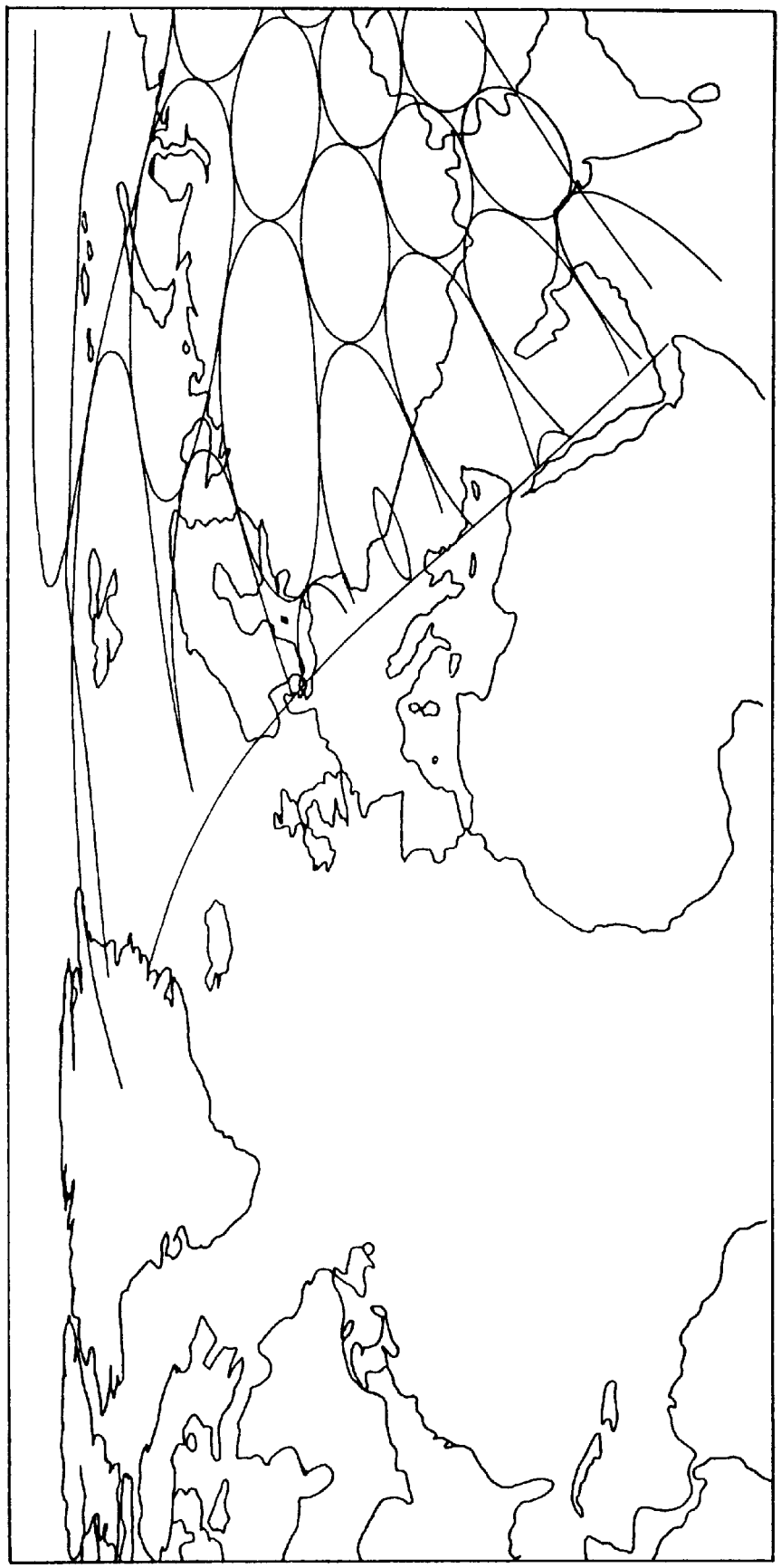
Figure 14:
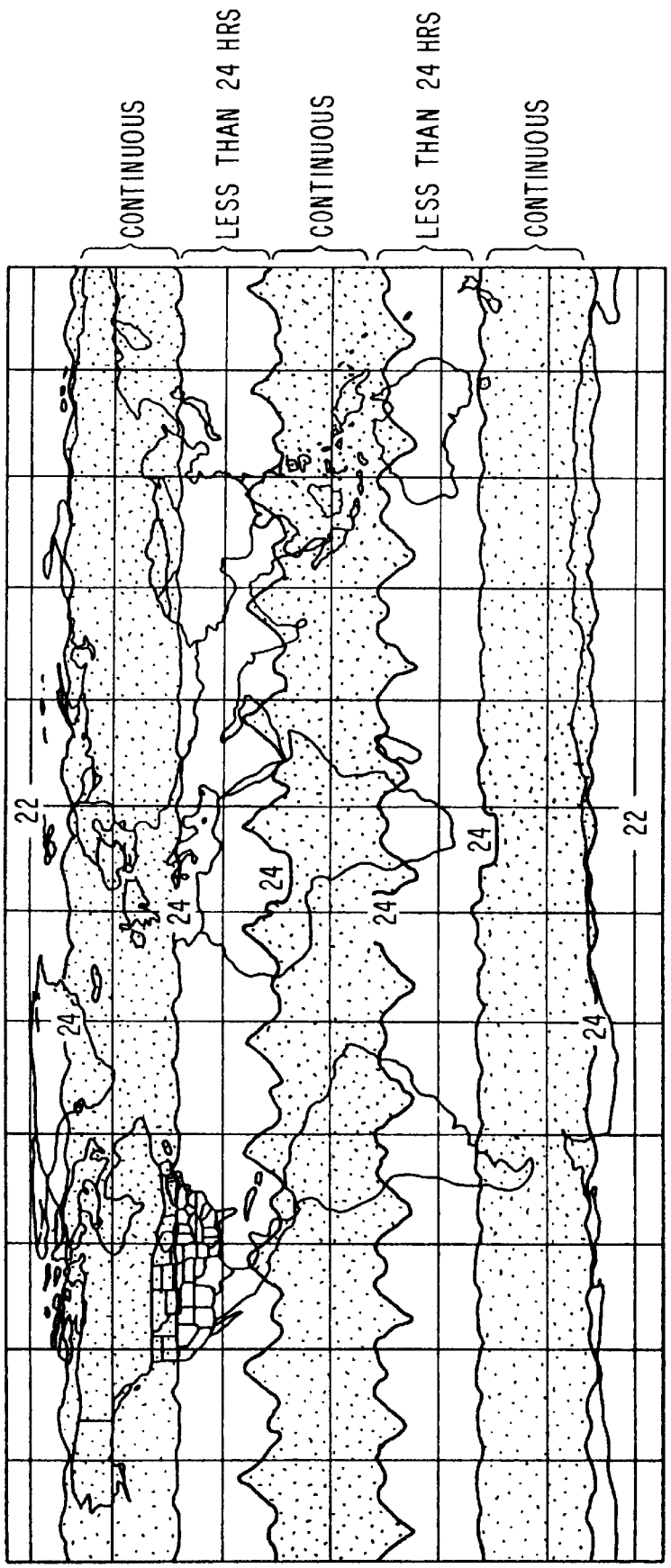
FIG. 14 is a cartographic illustration of satellite visibility using an alternate constellation wherein each of the satellites reside in their own individual orbital planes.
Figure 15:
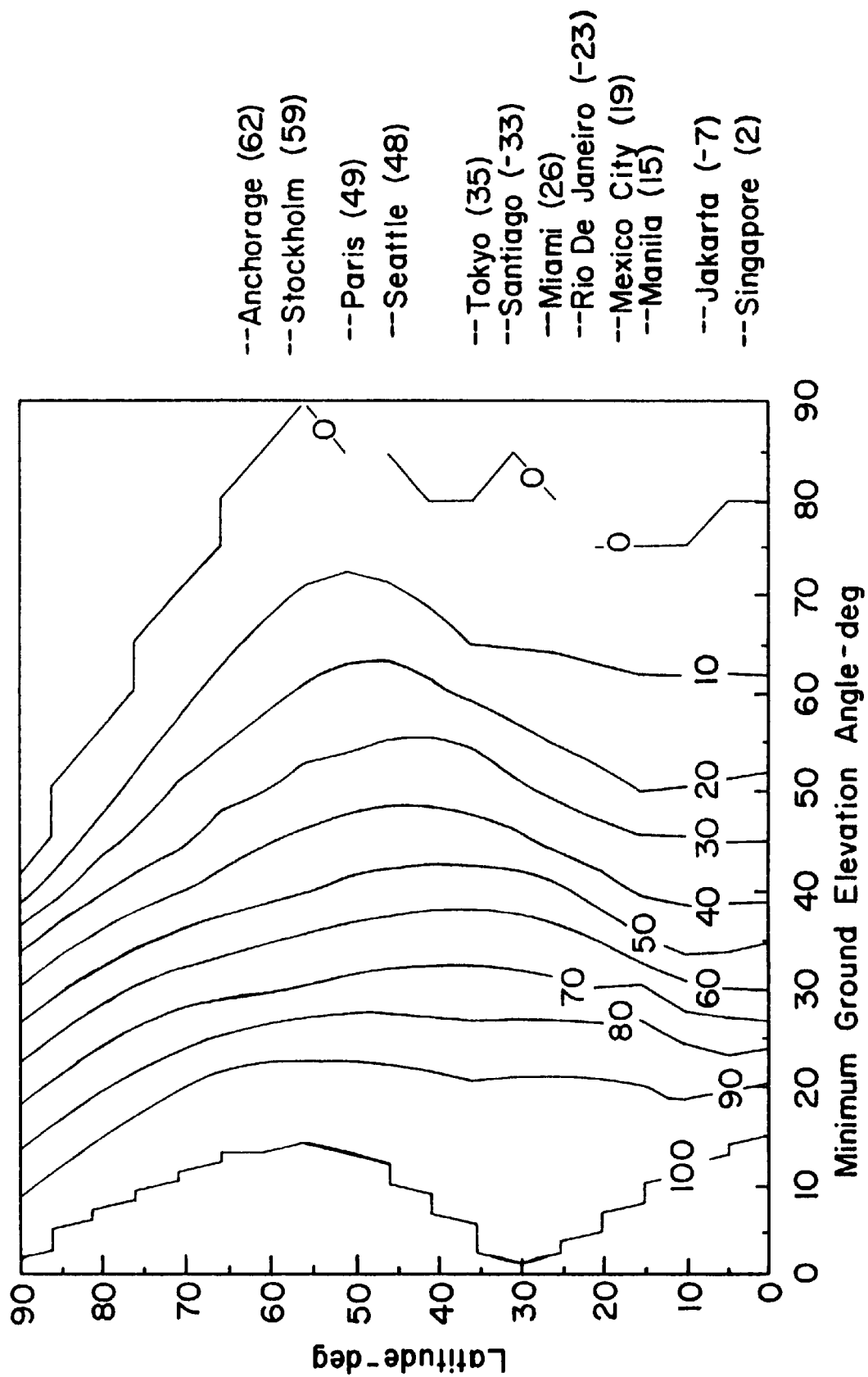
FIG. 15 is a graphical illustration of satellite coverage using the original constellation referred to in FIG. 14.
Figure 16:
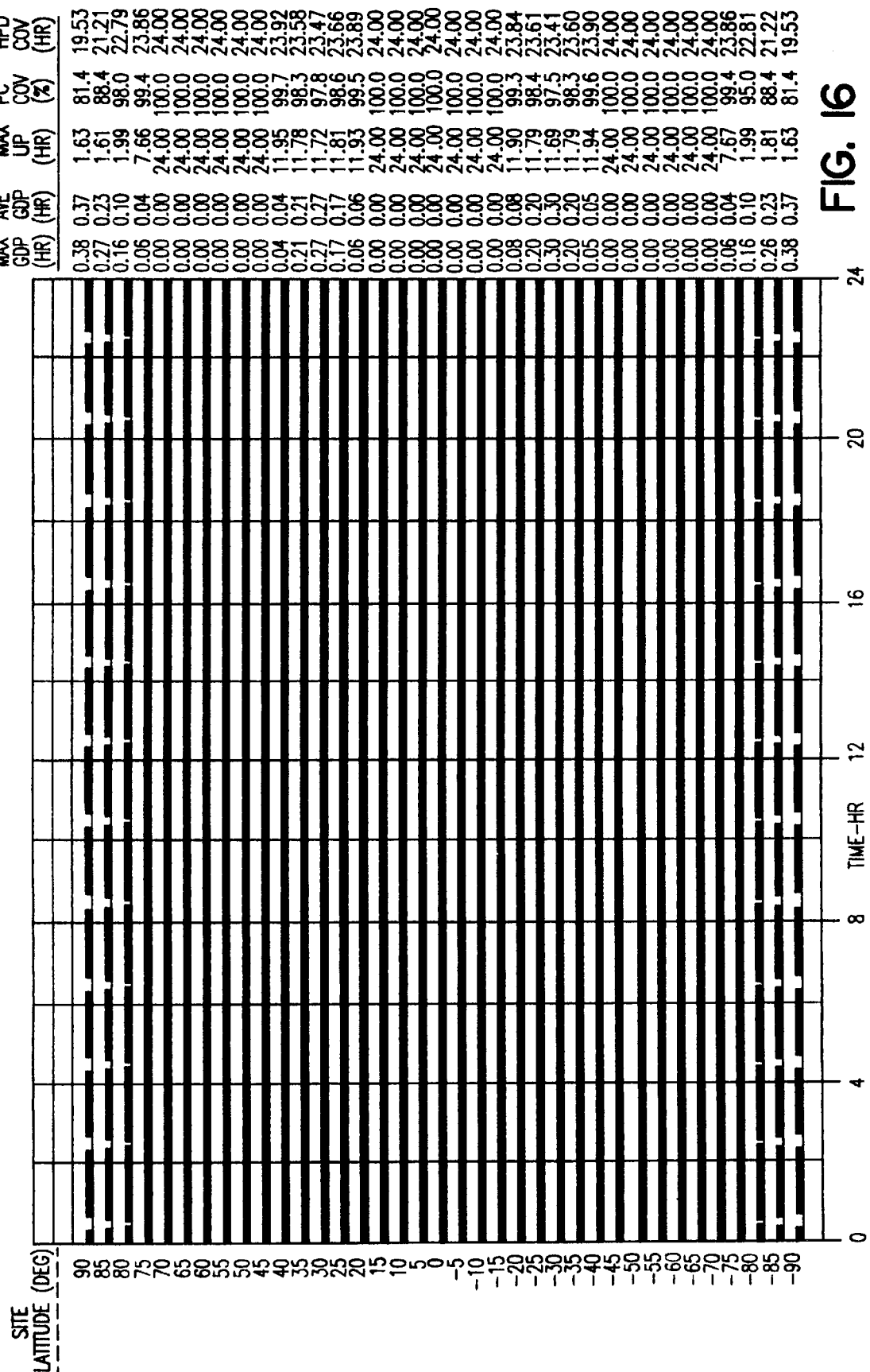
FIG. 16 is another graphical illustration of satellite coverage using the original constellation referred to in FIG. 14.
Figure 17:
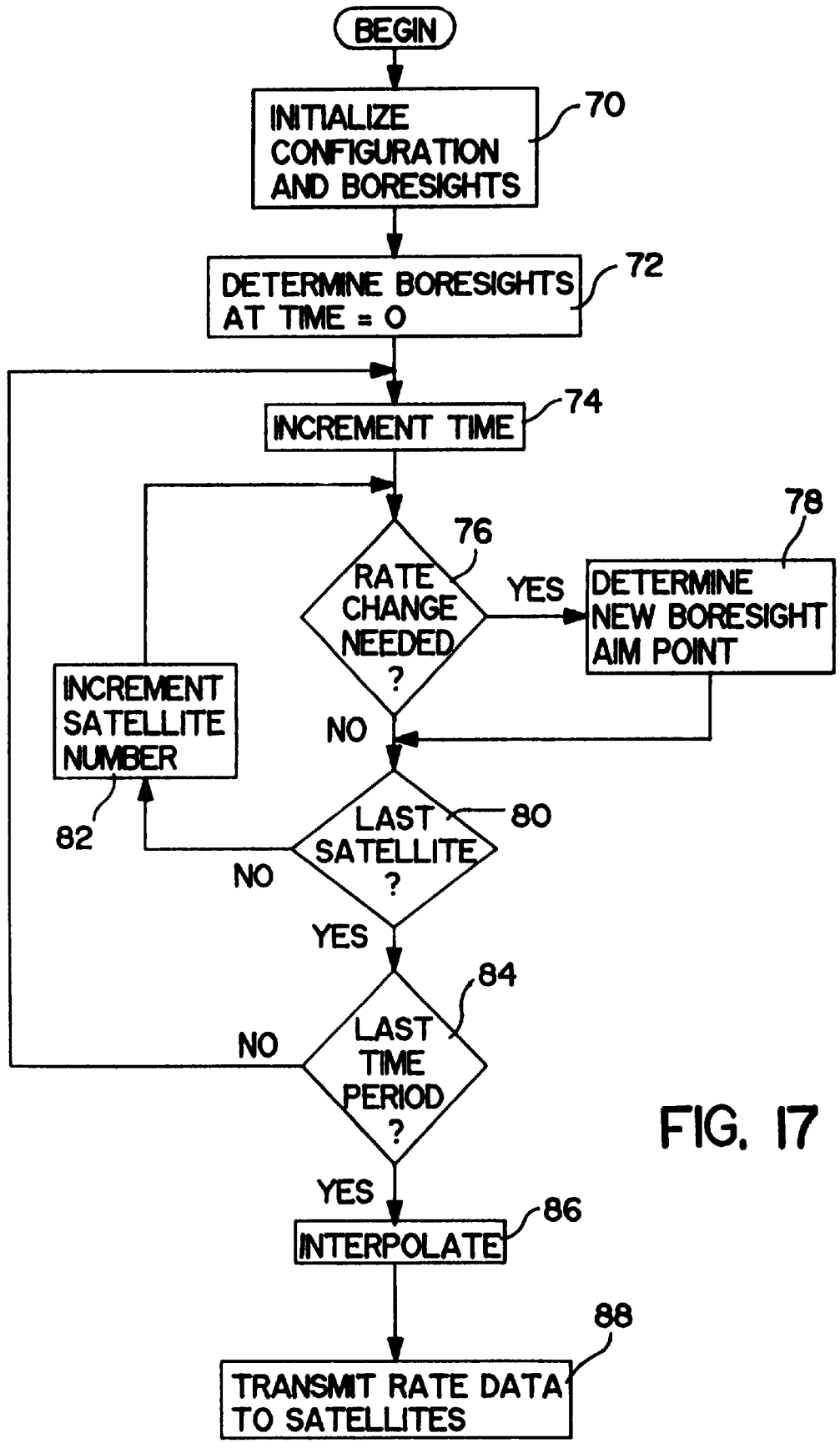
FIG. 17 is a flow chart which illustrates a coordinated boresight steering method.
Figure 18:
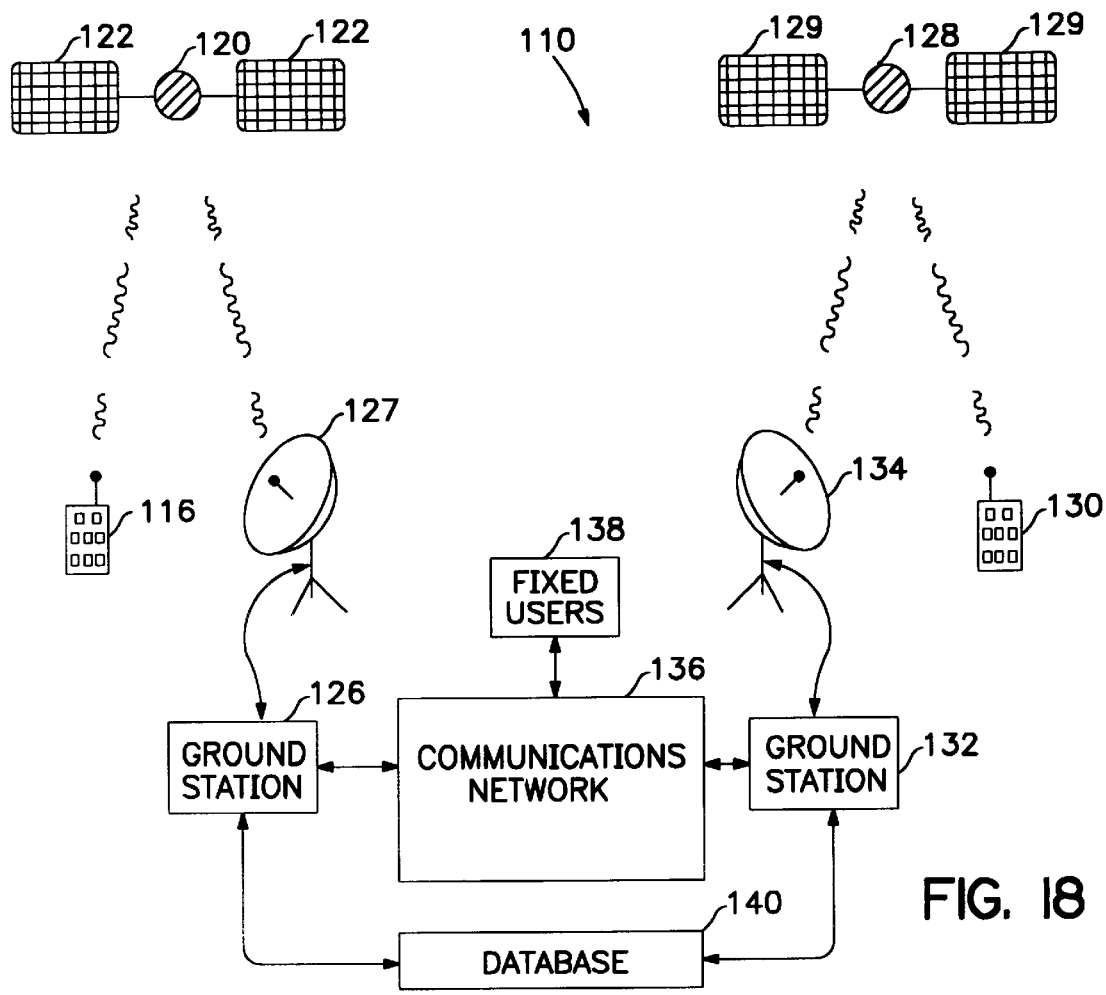
FIG. 18 is a schematic block diagram of a satellite-based mobile communication system incorporating a mobile handset tracking and paging system which may be utilized in accordance with the present invention.
Figure 20:
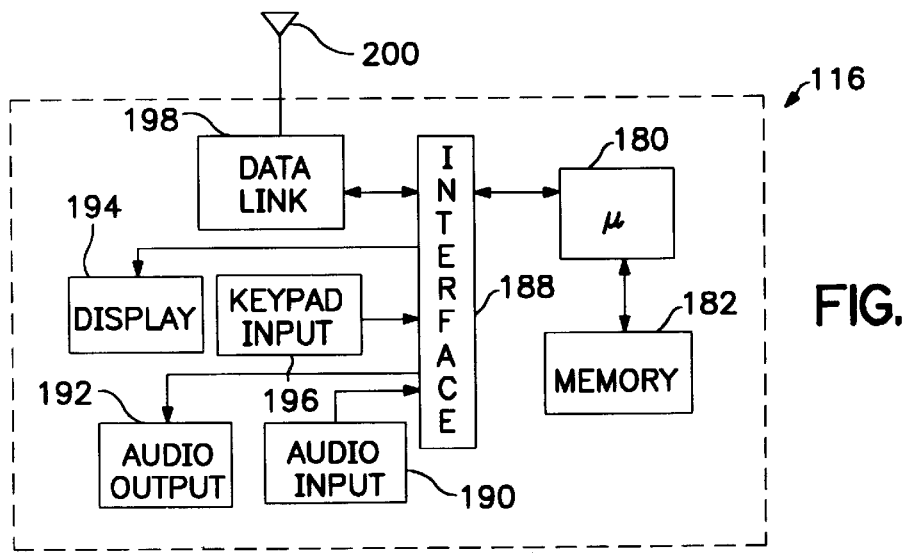
FIG. 20 is a schematic block diagram of a mobile handset.
Figure 19A:
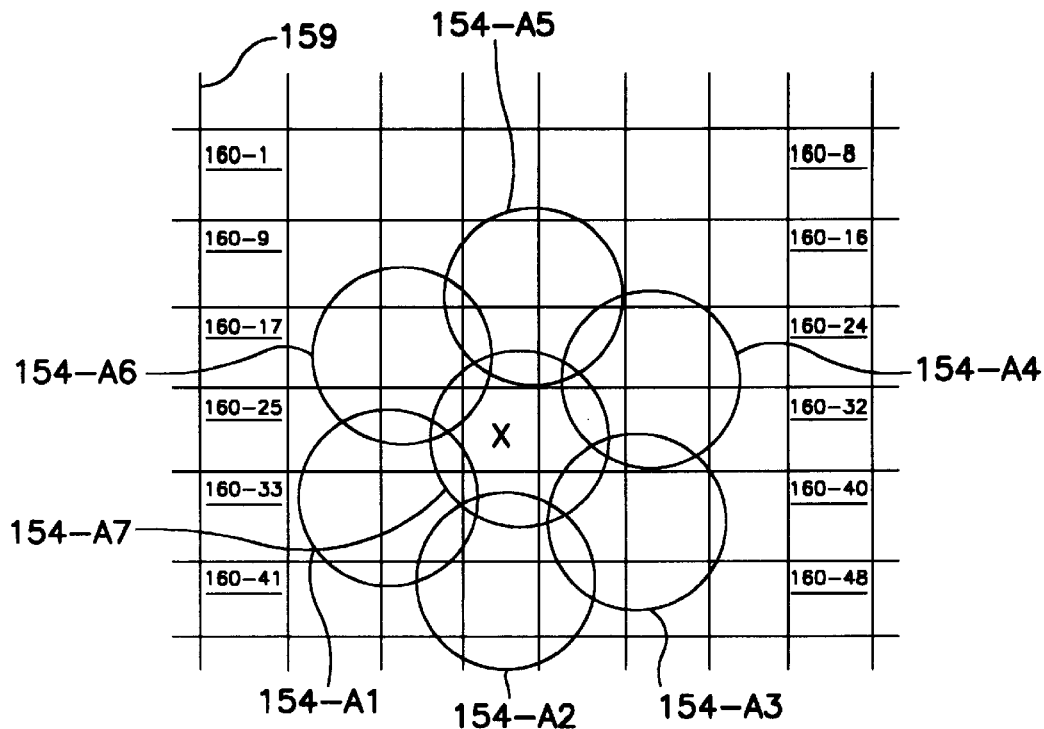
FIGS. 19a, 19b, 19c and 19d illustrate a grid including a plurality of grid sections, fixed with respect to the earth, and a plurality of individual focused beams generated by one or more sub-geosynchronous satellites.
Figure 19B:
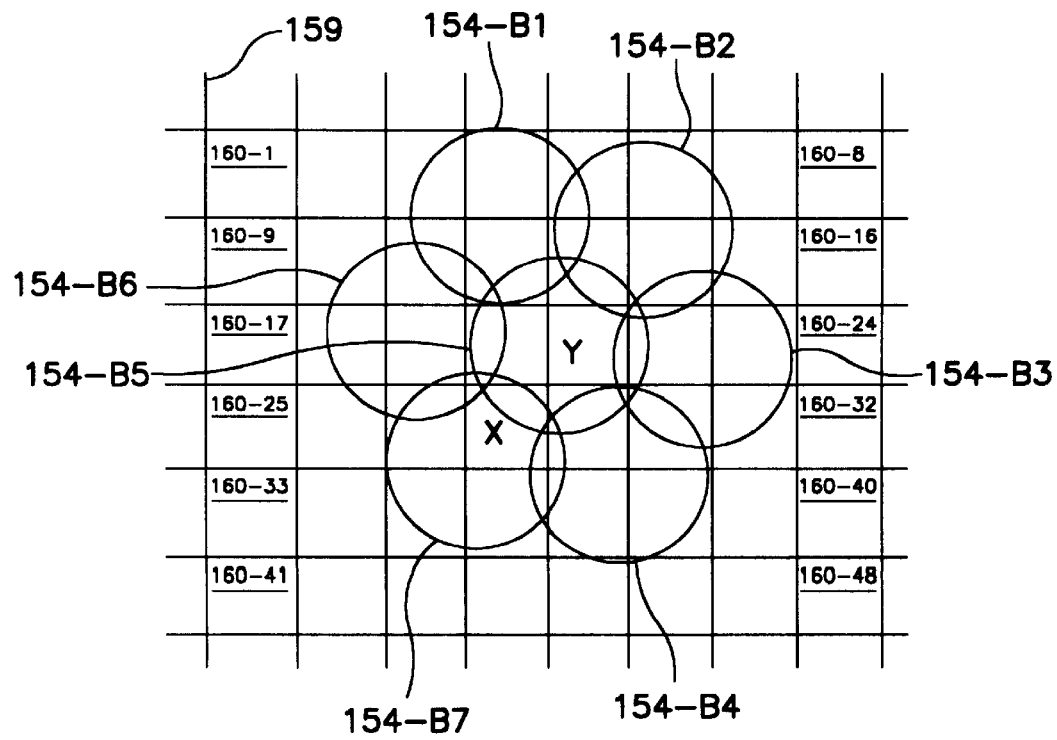
Figure 19C:
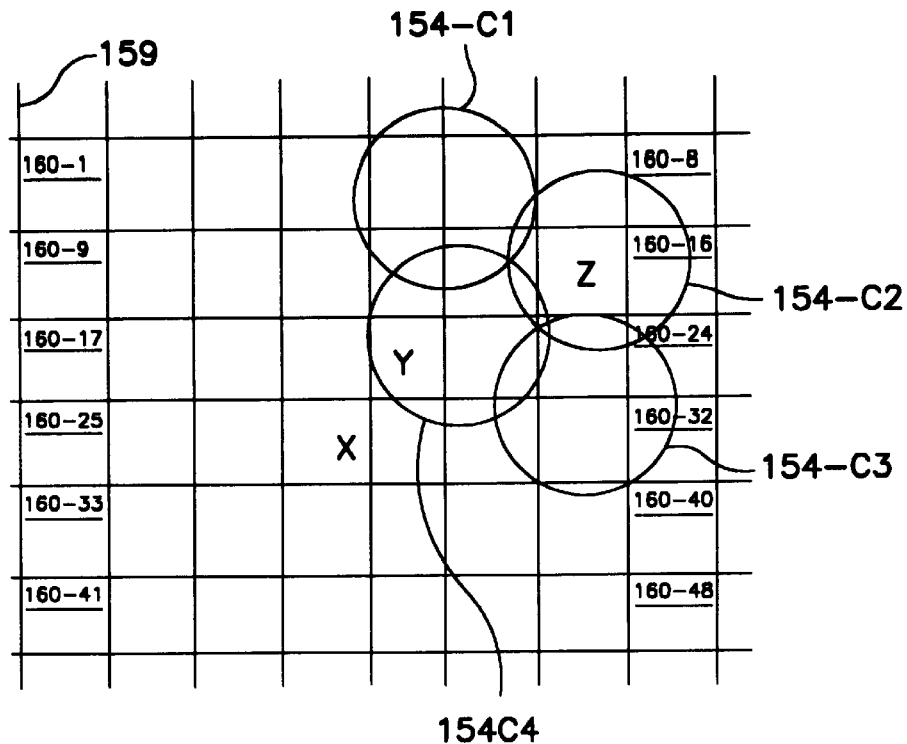
Figure 19D:
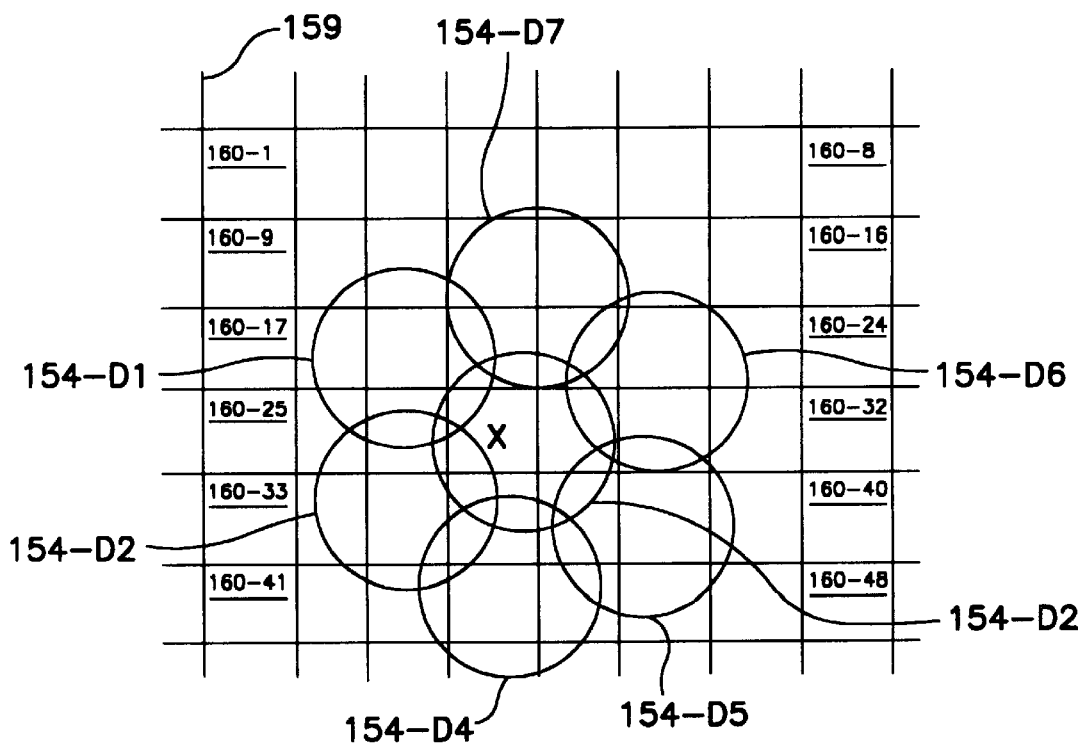
Figure 22:
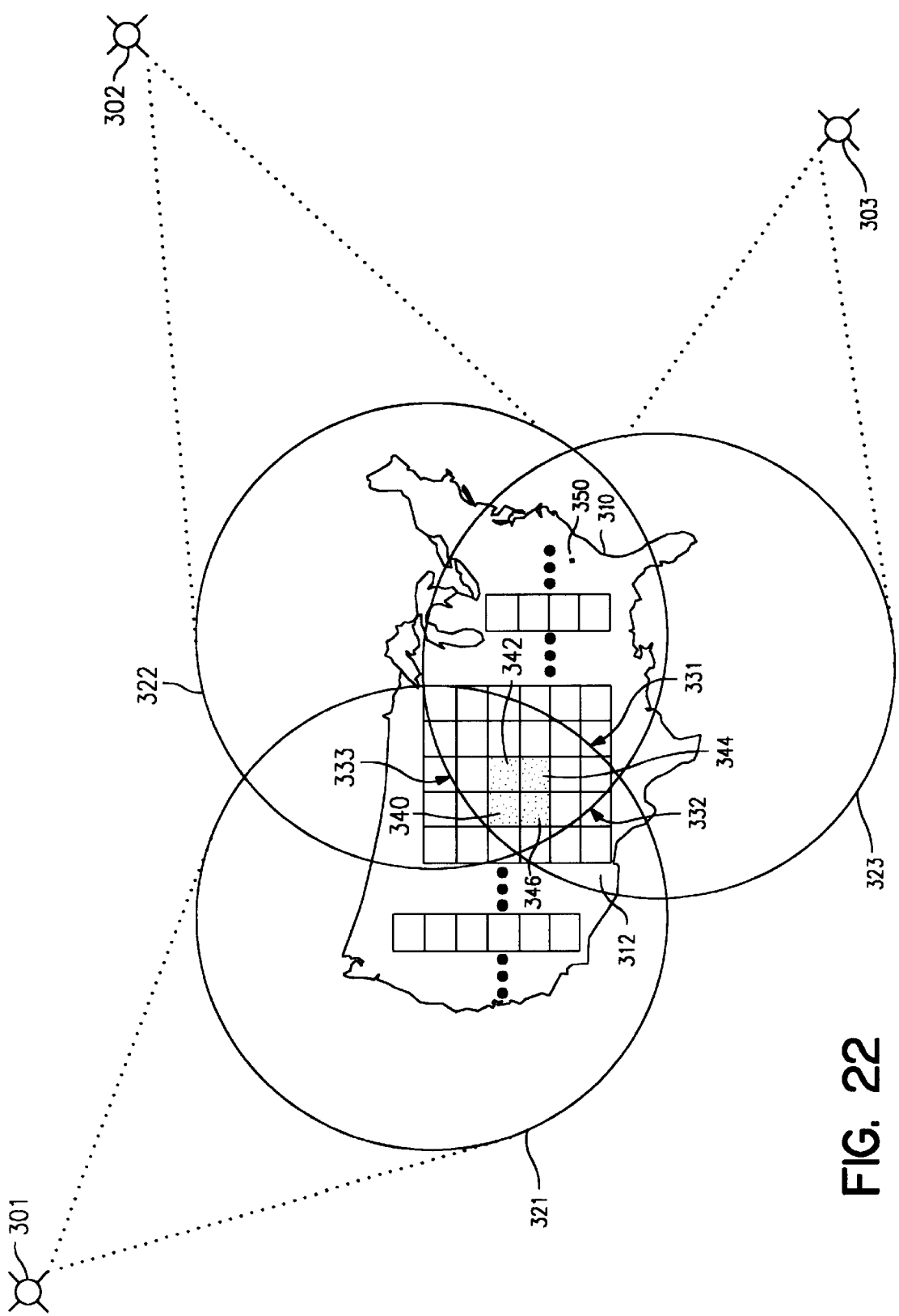
FIG. 22 provides a cartographic exemplary illustration of overlapping satellite coverage and grid divisions of a service region.

In FIG. 22, communication satellite 301, communication satellite 302, and communication satellite 303 are capable of providing bi-directional communication services for a service region 310 which contains a plurality of mobile cellular stations. The communication satellites handle the communications for the mobile cellular stations within the service region 310. For this example, the United States was chosen as the service region 310. However, it should be understood that other communication satellites will be providing communication services at the same time to other regions around the world, such as Europe, Asia and South America. Alternatively, the system could be designed with the world representing a single region and with the power balanced among all of the system satellites.

The service region 310 is divided up into grids located at 312. The size of these grids are preferably small enough so that a communication satellite appears at approximately the same elevation angle to mobile cellular stations within the same grid. In one exemplary embodiment, the grids are rectangular and have the dimensions of 2 degrees by 2 degrees. It should be understood that many other grid sizes and grid shapes are within the scope of the present invention. Within the squared set of grids generally designated by reference numeral 312 are a varying number of mobile cellular stations.

Communication satellite 301 provides a first area of coverage 321 for a portion of the service region 310. Communication satellite 302 provides a second area of coverage 322 for a portion of the service region 310 and communication satellite 303 provides a third area of coverage 323 for a portion of the service region 310. In this example, the three areas of coverage partially overlap one another. The overlapping coverage area which is the commonly-covered service region of the three communication satellites is depicted as the area enclosed by curve 331, curve 332, and curve 333. Also grid 340, grid 342, grid 344, and grid 346 are contained within the overlapping coverage area.

In accordance with the present invention, for each of the communication satellites a power utilization factor is determined as necessary to provide a down-link of fixed bandwidth transmission to each of the covered grids. In one embodiment according to the present invention, the radio frequency (RF) power required for a single-satellite transmission is determined for each of the commonly covered grids. Thus, for example, the RF power required for a down-link transmission by communication satellite 301 to grid 340 would be determined. In turn, the RF power required for a transmission by the other two communication satellites to grid 340 would be determined.

After completing the determination of the RF power required for a transmission of each communication satellite to all of the covered grids, one of the communication satellites 301–303 would be assigned to a commonly covered grid based on the determined values of the power utilization factor. More particularly, a set of assignments is preferably made that minimizes the maximum RF power required of any satellite for the communication satellite system to supply a single transmission to each of the region's grids.

The present invention includes at least one control station 350 to assist in assigning communications from the three communication satellites to the commonly covered grids. It should be appreciated that more than one control station may be used and placed in locations other than the exemplary location of the control station 350 in FIG. 22.

Figure 23:
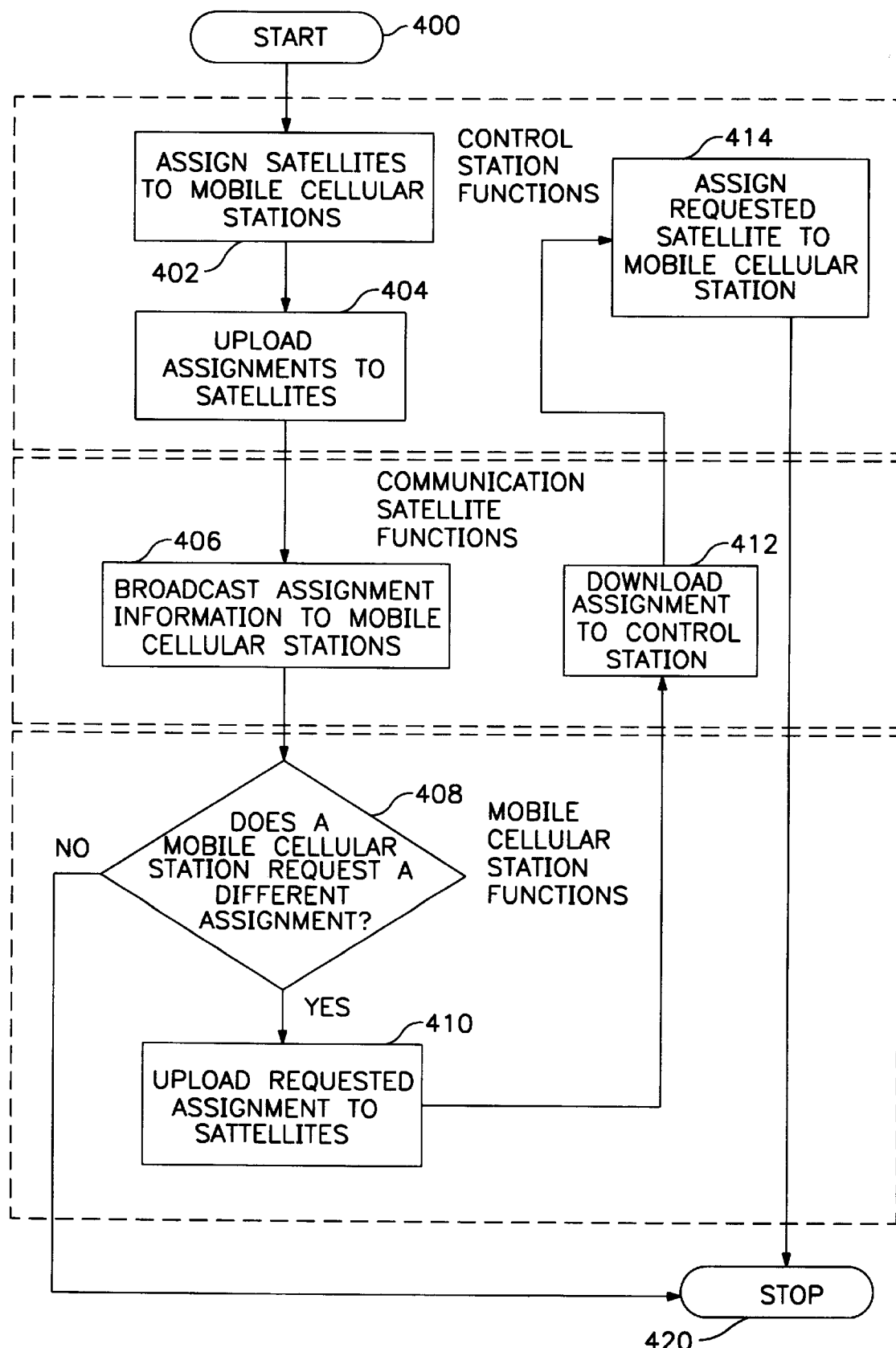
FIG. 23 is a flowchart which illustrates functional interactions among a control station, a communication satellite, and a mobile cellular station for performing the operations of the present invention.

FIG. 23 shows the present invention's functional interactions among the control station, communication satellites, and mobile cellular stations. The start indicator 400 indicates that the control station function at block 402 is processed first. Block 402 designates that the control station assigns communication satellites to mobile cellular stations. Subsequently, block 404 depicts that the control station uploads the assignments to the communication satellites.

After the upload, processing continues at block 406 where the communication satellites broadcast the assignment information to mobile cellular stations located in their assigned grids. At decision block 408, a mobile cellular station may request a satellite assignment other than the one selected by the control station. For example, a mobile cellular station may request to use a different communication satellite when the mobile cellular station is not able to establish a sufficiently reliable communication link with the particular communication satellite that was assigned by the control station. Such a situation could arise when the mobile cellular station is at least partially blocked from the assigned communication satellite by buildings.

If the mobile cellular station does not request a different assignment, then the flow for this aspect of the present invention proceeds to the exit indicator 420. In other words, the mobile cellular station will initiate communication through the pre-assigned satellite when the user desires to place a telephone call or otherwise begin an appropriate communication session (such as voice, data, video and so forth) with another communication station. The mobile cellular station also listens to the pre-assigned satellite for an incoming call while in standby mode. However, if the mobile cellular station does request a different assignment, then the flow for this aspect of the invention continues at block 410.

At block 410, the mobile cellular station uploads the requested satellite assignment to the pre-assigned communications satellite. At block 412, the pre-assigned communication satellite downloads the requested assignment to the control station. The control station processes that requested assignment at block 414 where the control station assigns the requested satellite to the mobile cellular station. Thereupon, the flow for this aspect of the invention proceeds to the exit indicator 420.

It should also be appreciated from the above that the present invention is concerned with power-limited applications. In the event that other limitations are imposed on one or more satellites, such as limited bandwidth, the assignment method according to the present invention may need to be modified to accommodate other such concerns. Similarly, due to the time varying nature of coverage provided by a non-geostationary satellite, there may be time limitations as well as bandwidth limitations. For example, the most appropriate assignment criteria in a given situation may be based upon the time remaining for a satellite to cover an area, as set forth above. Accordingly, it should be understood that the assignment criteria may be dependent upon several competing factors, and that the power utilization factor taught herein is an important factor since it may be employed according to the present invention to maximize regional capacity.

It should further be understood that the present invention may be employed in satellite-based cellular telecommunication systems that employ satellites in both low and medium-earth altitude orbits. While the present invention is particularly effective in the medium-earth altitude systems described above, the present invention has applicability to any satellite-based cellular telecommunication systems which have satellites in non-geostationary orbits where two or more satellites are capable of simultaneously covering the same cellular region. For example, a number of low-earth altitude cellular telecommunication systems have been proposed (that is, satellite-based systems whose orbits are disposed below the Van Allen Belts). These systems also provide a degree of multiple satellite coverage.

With respect to the use of a control station in the present invention, such as control station 350, it is preferred that control station upload assignment information to the satellites as they pass overhead for a predetermined period of time. For example, in the situation where a satellite, such as satellite 303, passes over control station 350 once per day, then the control station may upload all of the assignment information needed by the satellite 303 for a period of at least one day. However, this is not to say that the uploaded assignment information may not be for suitably longer periods of time, because it may be more appropriate to upload such information for longer periods of time, such as a week. Aside from the need to periodically upload assignment instructions to a satellite, it should be understood that the present invention does not depend upon the number of orbits employed or other similar constellation building specifications. Indeed, even the control stations themselves do not need to be fixed ground stations per se, as airborne or maritime control stations could be employed as well.

The control station(s) will preferably employ historical data of power utilization requirements in the past in order to determine the most appropriate assignments for the satellites in the next service period.

Figure 24A:
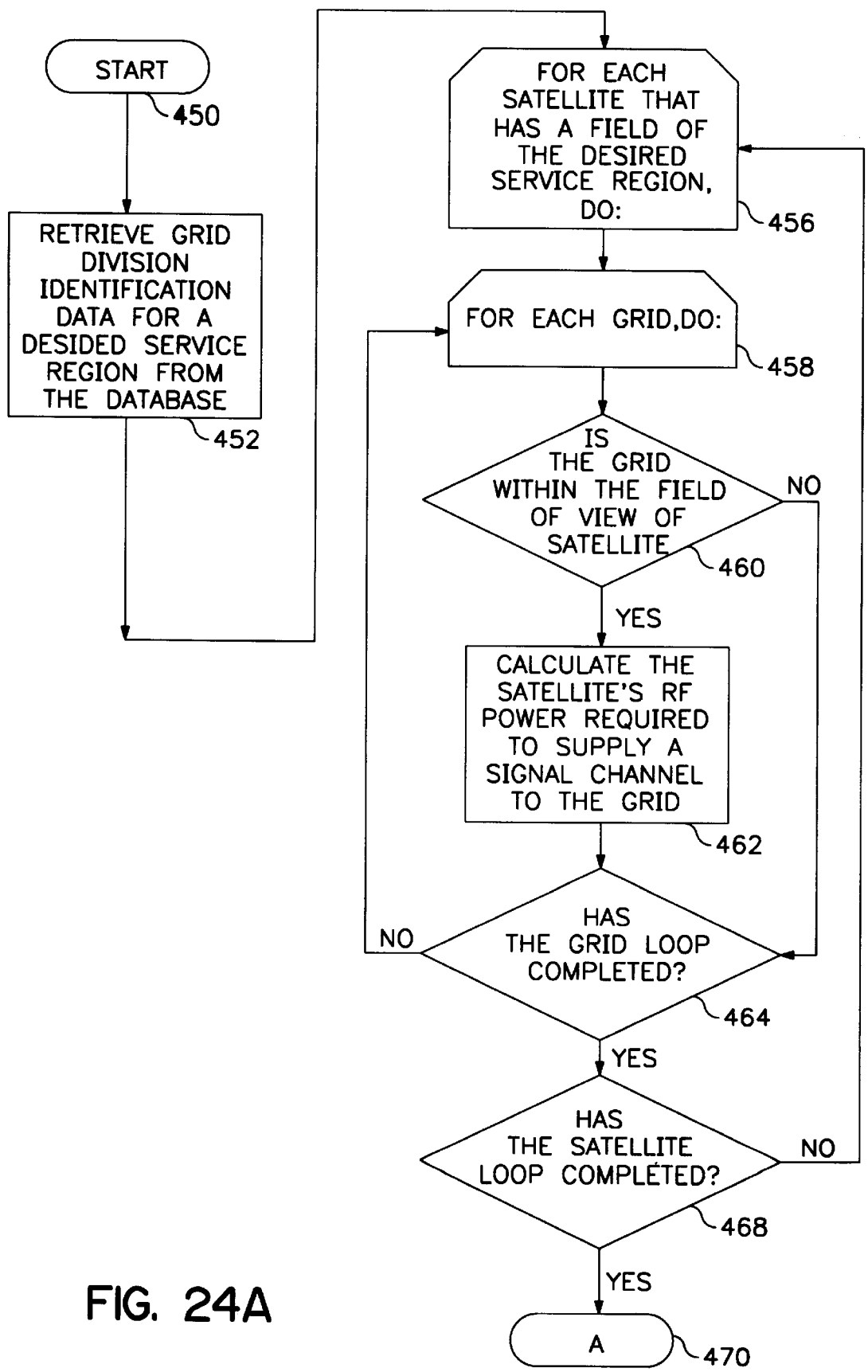
FIGS. 24A and 24B provide a flowchart which illustrates the communication satellite load balancing method for achieving maximum regional system capacity.

FIG. 24a illustrates the preferred communication satellite transmission load balancing method and apparatus in greater detail. The start indicator 450 indicates that the initial step at block 452 is processed first. Block 452 depicts that the grid division identification data for a desired service region is retrieved from the database.

Block 456 an iterative construct w designates that the next several blocks of the flowchart are to be performed for each satellite which has a field of view of the desired service region. Within the iterative construct of block 456 is block 458. Block 458 is another iterative construct which designates that the next several blocks are to be performed for each of grid.

Within both of the iterative constructs of block 456 and block 458, the decision block 460 is processed which inquires whether the grid for the particular iteration of block 458 is within the field of view of the current communication satellite for the particular iteration of block 456. If the grid is not within the field of view of the current communication satellite, then processing continues at block 464. However, if the grid is within the field of view, then at block 462 the satellite's RF power required to supply a single channel to the selected grid for the current iteration of block 456 is calculated.

Block 464 inquires whether all of the grids have been evaluated for the communication satellite of the current iteration of block 456. If more grids need to be evaluated, then processing resumes at block 458 which allows the next grid to be evaluated for the communication satellite of the current iteration of block 456. However if no more grids need to be evaluated for the communication satellite of the current iteration of block 456, then processing continues at block 468.

Block 468 inquires whether all of the communication satellites that have a field of view of the desired service region have been processed. If additional communication satellites need to be evaluated, then processing resumes at block 456 which allows the next selected communication satellite to be evaluated. However if additional communication satellites are not to be evaluated, then the flow branches to the flowchart "A" continuation indicator 470.

Figure 24B:
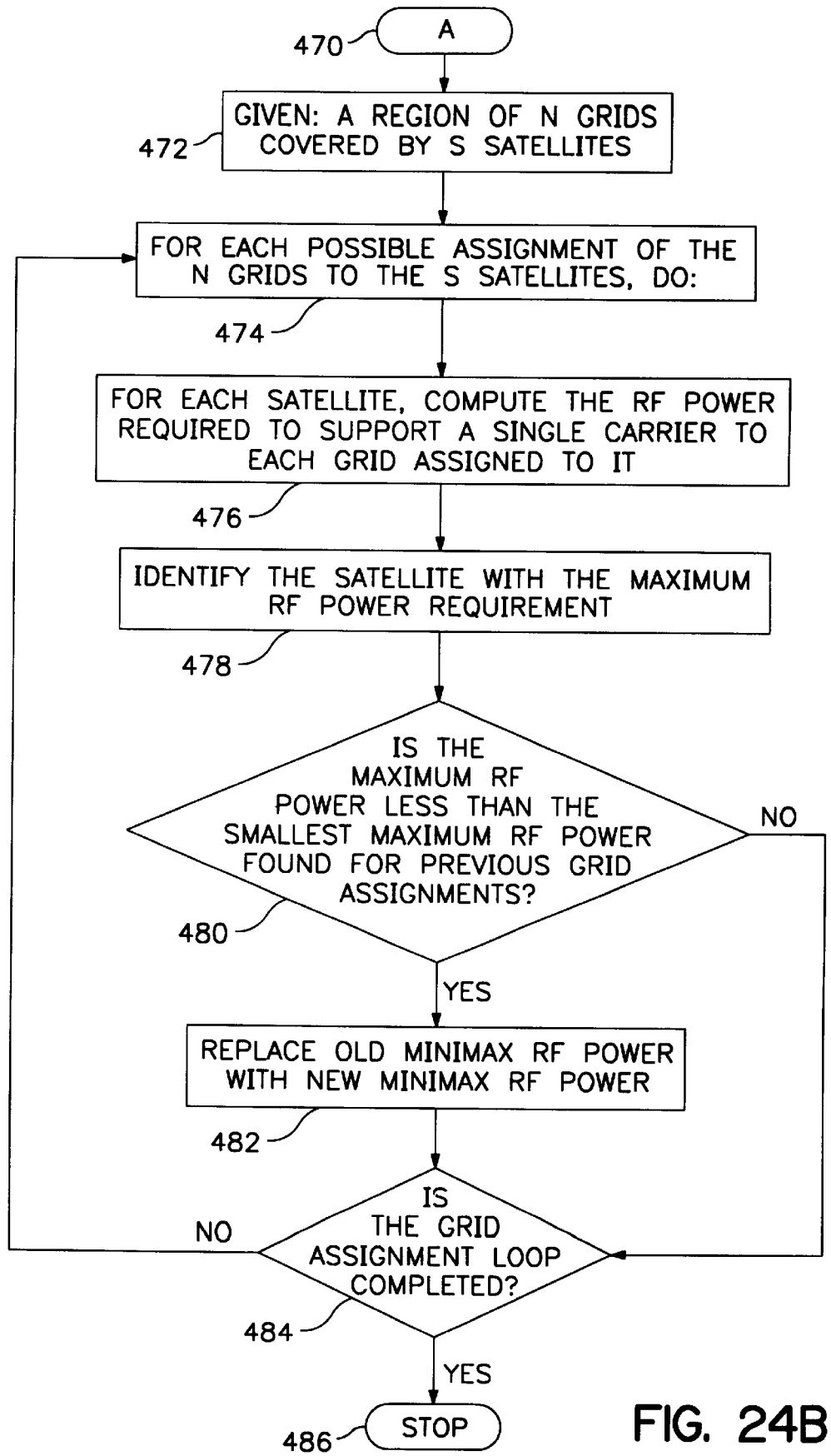

FIG. 24b continues the processing from the flowchart "A" continuation indicator 470 at block 472. Block 472 states the underlying premise which is valid for the remainder of the flowchart that a region of "N" grids is covered by "S" satellites.

Block 474 is an iterative construct which designates that the next several blocks are to be performed for each possible assignment of "N" grids to "S" satellites. Within the iterative construct of block 474 is block 476. For each satellite, block 476 computes the RF power required to support a single carrier to each grid assigned to it. Block 478 then identifies the satellite with the maximum RF power requirement.

The decision block 480 inquires if the maximum RF power is less than the smallest maximum RF power found for previous grid assignments. If it not less, then processing continues at decision block 484. However if the maximum RF power is less than the smallest maximum RF power found for previous grid assignments, then block 482 replaces the old minimax RF power with the new minimax RF power. Thereupon processing continues at decision block 484.

Decision b k 484 inquires if the grid assignment loop has completed. If the loop has not completed, then processing returns to block 474 for the next iteration of the grid assignment loop. If the loop has completed, then processing terminates at the stop indicator 486.

The methodology of FIG. 24B requires that the control station considers every possible assignment of "N" grids to "S" satellites. However, such a large comparison need not necessarily be conducted. According to the process of FIG. 24B, $S^N$ possible sets of assignments must be considered. For certain values of "S" and "N", the set $S^N$ may be unduly large. Therefore, it may be desirable to substitute an alternative method, for that of FIG. 24B, which examines a subset of the total number of possible sets of assignments $S^N$. The alternative methods may vary so long as they provide the optimum set of assignments or one that affords a system capacity nearly as large as the capacity associated with the optimum assignment set.

This assignment method yields a definition of system capacity as:

System Capacity (in channels)=(Ps/Pm)*N where:

Ps is the RF power available from each communication satellite;

Pm is the minimax communication satellite power; and

N is the number of selected grids.

In an alternative embodiment, each grid contains an entry which is proportional to the user density in the grid. For example, the entries might range from 1 to 10. Moreover, in this example, there "G" grids and the entry in the "ith" grid is denoted by "$n_i$". The communication satellite RF power required to supply grid "i" with "n" channels is computed for each communication satellite that covers grid "i". The set of assignments of communication satellites to grids is selected that minimizes the maximum single communication satellite RF power required for the communication satellites collectively to supply grid "i" with "$n_i$" channels, for all values of i. For this particular embodiment the system capacity is:

System Capacity (in channels =(Ps/Pm')*N where:

Ps is the RF power available from each satellite;

Pm' is the minimax satellite power; and

N is determined by the following equation:

$$N = \sum_{i=1}^{G} n_i$$

Moreover, if one type of environment is dominant (for example, rural), then the present invention may use the environment type to modify the required communication satellite power per channel accordingly. In addition, the present invention may also allow a pair of communication satellites to share support of a grid. Depending on the number of grids involved in the optimization process, these refinements may yield a significant reduction in the minimax communication satellite power and accordingly will yield a significant increase in the computed communication satellite capacity for a service region.

Figure 25:
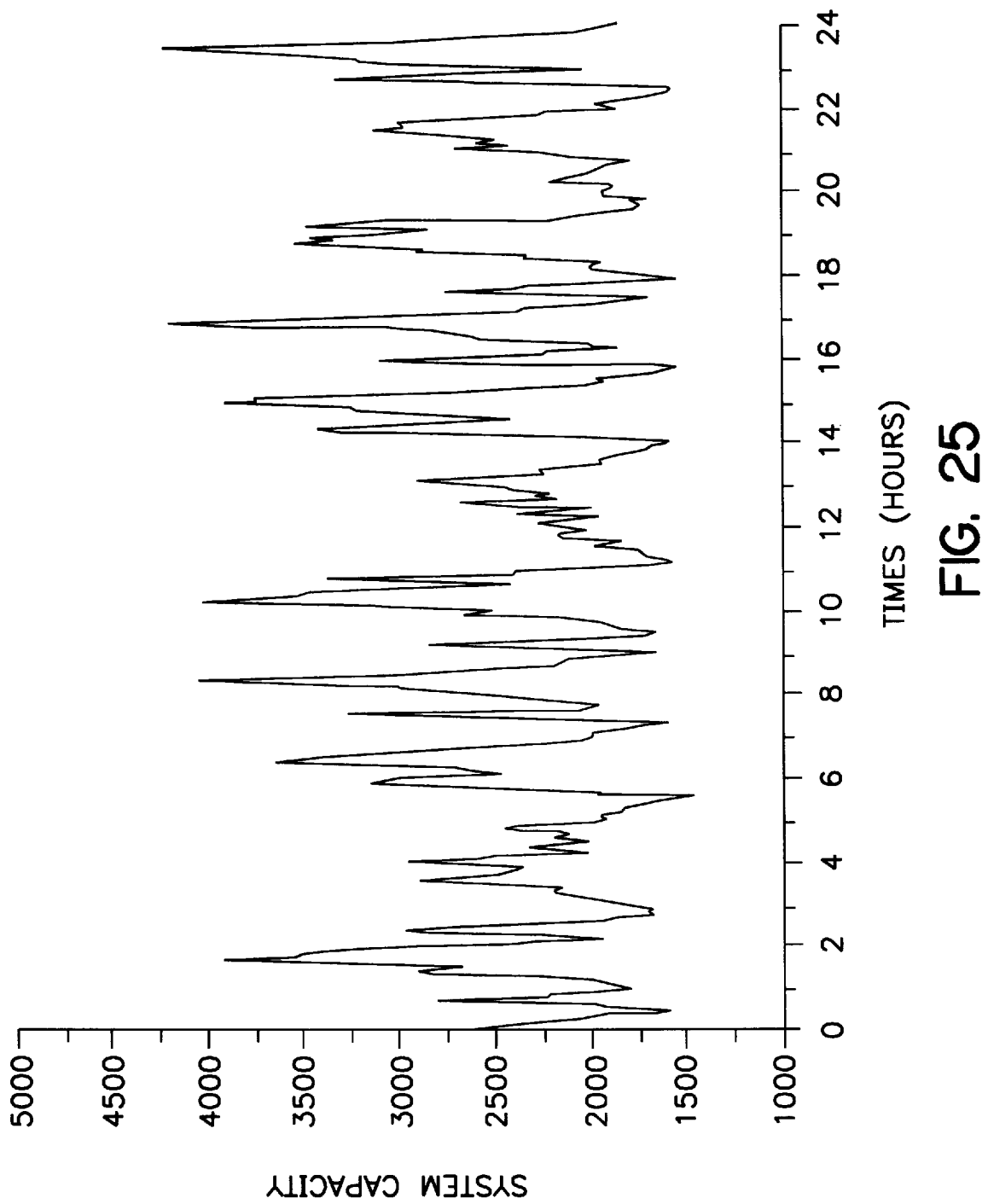
FIG. 25 is a graph which shows the satellite system capacity for a service region over time when the communication satellites are selected by mobile cellular stations.
Figure 26:
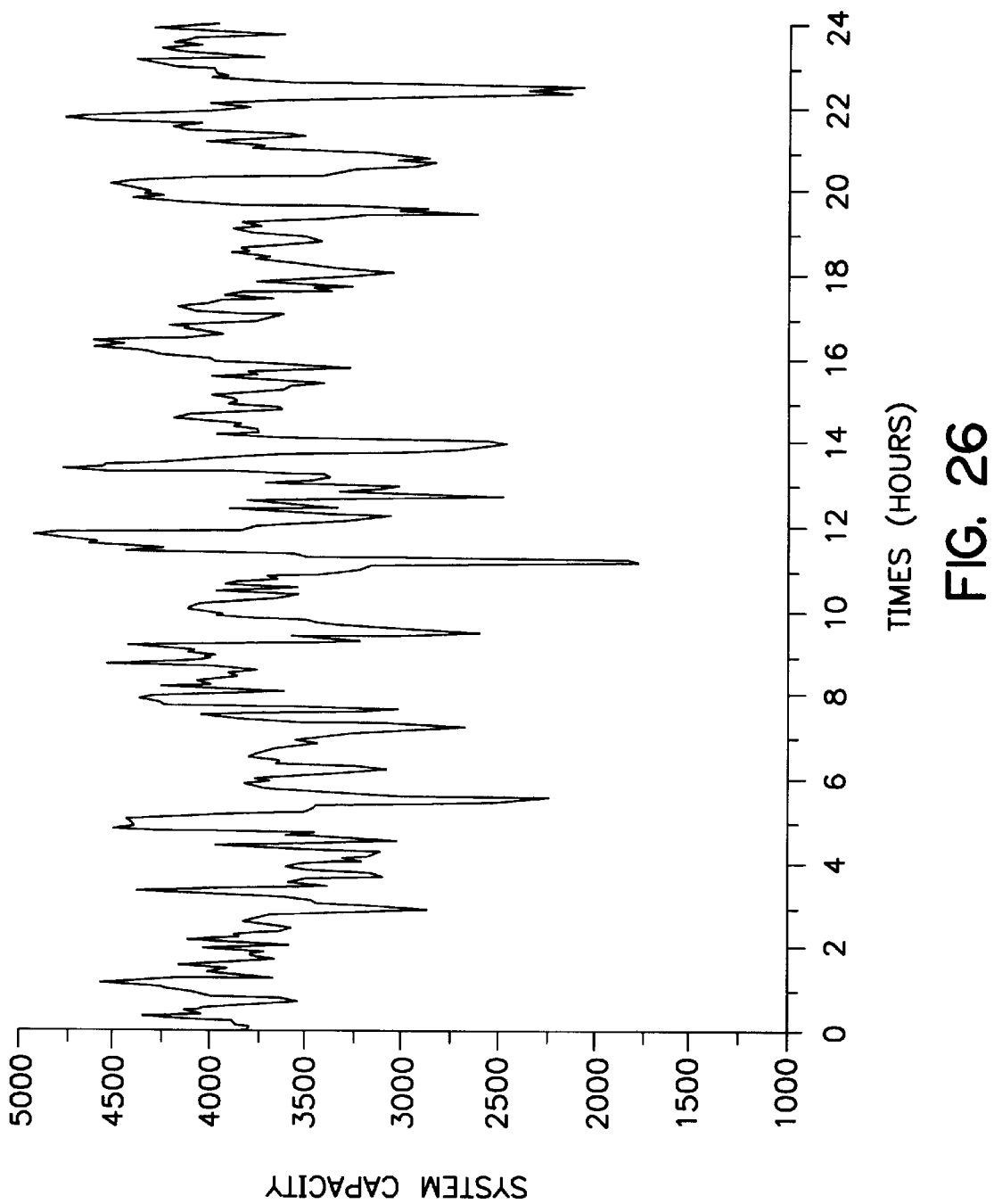
FIG. 26 is a graph which shows the satellite system capacity for a service region over time when the communication satellites are assigned by a control station.

FIG. 25 and FIG. 26 illustrate the efficacy of the assignment method and system of the present invention. The service region chosen for this example was North America, periodically covered by various combinations of twelve communication satellites which is orbiting at an altitude of 5600 nautical miles.

Data for the mobile cellular stations that comprise this service region were generated by representing the mobile cellular subscriber population by eighteen population centers spread across North America. Equal weight was given to each of the locations.

The graph of FIG. 25 shows an exemplary communication satellite system capacity over a twenty-four hour period for the North American landmass. The ordinate axis shows the communication satellite system capacity in terms of channels available to the North American service region, under the condition that the satellites are selected independently by the mobile cellular station.

FIG. 26 is a graph similar to the graph of FIG. 25. The distinction is that the graph of FIG. 26 shows the communication satellite system capacity where the communication satellites are assigned by the control station. A comparison of the two communication satellite system capacity profiles demonstrates that assignments by the control station results in a substantially higher communication satellite system transmission capacity.

For a time varying system capacity as depicted in FIG. 25 or FIG. 26, a reasonable way to measure communication satellite transmission capacity is the level of busy-hour offered traffic for which the blocking probability does not exceed X% more than Y% of the time. For reasonably chosen values of "X" and "Y", the system capacity in FIG. 25 is at most 2000 channels. However, the system capacity in FIG. 26, computed in the same manner, exceeds 3000 channels. Thus, the communication satellite system transmission capacity for a service region may be increased by more than 50% by assigning communication satellites in conformity with the present invention.

A reason for the substantially higher system capacity for the control station assignment approach is that if each mobile cellular station were allowed to communicate through a communication satellite of its own choosing, it typically would decide on the basis of its received signal strength. This mobile cellular station assignment approach could lead to one of the communication satellites becoming saturated while one or more of the other communication satellites remained unnecessarily underutilized.

The invention has been described in an exemplary and preferred embodiment, but is not limited thereto. Those skilled in the art will recognize that a number of additional modifications and improvements can be made to the invention without departure from the essential spirit and scope. The scope of the invention should only be limited by the appended set of claims.

We claim:

1. A method of controlling system capacity in a satellite-based cellular telecommunication system having a plurality of communication satellites orbiting above a commonly-covered region of the earth and a plurality of mobile cellular stations which are capable of transmissions with at least a plurality of said orbiting communication satellites during at least some interval of time, said commonly-covered region having a plurality of grids, each of said grids having a plurality of mobile cellular stations, comprising the steps of:

determining a power utilization factor for each of said communication satellites required to supply one of said transmissions to each of a plurality of said grids; and assigning each of said plurality of grids to at least one of said orbiting communication satellites to handle communications between said plurality of grids and said orbiting communications satellite, wherein said assignments minimize the maximum single-satellite power required for said satellite-based cellular telecommunications system to supply transmissions to each of said plurality of grids.

2. The method according to claim 1, wherein said power utilization factor is a measure of radio frequency transmission power.

3. The method according to claim 1, wherein said communication satellites are disposed in at least one orbit which is non-synchronous with the earth.

4. The method according to claim 3, wherein said communication satellites are disposed in at least one orbit having a medium-earth altitude between 5,000 and 10,000 nautical miles.

5. The method according to claim 4, wherein said communication satellites are disposed in at least two of said medium-earth altitude orbits.

6. The method according to claim 1, wherein size of each of said grids provides substantially the same elevation angle to the mobile cellular stations located within the grid relative to each of said communication satellites having a line-of-sight to the grid.

7. The method according to claim 1, further comprising the step of:

enumerating each of said grids with a mobile cellular station density value proportional to the number of mobile cellular stations present within the grid.

8. The method according to claim 7, further comprising the step of:

determining said power utilization factor based on said mobile cellular station density value of each of said grids.

9. The method according to claim 7, wherein said grid assignments are based at least partly upon historical mobile cellular station density data, said historical data generated at some time other than approximately current said interval of time.

10. The method according to claim 9, further comprising the step of:

storing said grid assignments for an interval of time onboard each satellite.

11. The method according to claim 1, further comprising the step of:

storing said grid assignments for an interval of time onboard each satellite.

* * * * *